(12) United States Patent
Cohen

(10) Patent No.: US 11,946,599 B2
(45) Date of Patent: Apr. 2, 2024

(54) APPARATUS AND METHOD FOR HYDROGEN FUEL DISPENSING

(71) Applicant: Air Products and Chemicals, Inc., Allentown, PA (US)

(72) Inventor: Joseph P. Cohen, Bethlehem, PA (US)

(73) Assignee: AIR PRODUCTS AND CHEMICALS, INC., Allentown, PA (US)

( * ) Notice: Subject to any disclaimer, the term of this patent is extended or adjusted under 35 U.S.C. 154(b) by 17 days.

(21) Appl. No.: 17/835,350

(22) Filed: Jun. 8, 2022

(65) Prior Publication Data
US 2023/0400151 A1  Dec. 14, 2023

(51) Int. Cl.
*F17C 5/00* (2006.01)
*F17C 13/02* (2006.01)

(52) U.S. Cl.
CPC ............ *F17C 5/007* (2013.01); *F17C 13/02* (2013.01); *F17C 2221/012* (2013.01); *F17C 2250/032* (2013.01); *F17C 2250/0408* (2013.01); *F17C 2250/043* (2013.01); *F17C 2250/0443* (2013.01); *F17C 2250/0495* (2013.01); *F17C 2250/0694* (2013.01); *F17C 2250/075* (2013.01); *F17C 2260/026* (2013.01); *F17C 2265/065* (2013.01); *F17C 2270/0168* (2013.01)

(58) Field of Classification Search
CPC .... F17C 5/007; F17C 13/02; F17C 2221/012; F17C 2250/032; F17C 2250/0408; F17C 2250/043; F17C 2250/0443; F17C 2250/0495; F17C 2250/0694; F17C 2250/075; F17C 2260/026; F17C 2265/065; F17C 2270/0168

USPC .......................................................... 141/94
See application file for complete search history.

(56) References Cited

U.S. PATENT DOCUMENTS

| 6,401,767 B1 | 6/2002 | Cohen et al. |
| 6,474,078 B2 | 11/2002 | Chalk et al. |
| 6,619,336 B2 | 9/2003 | Cohen et al. |
| 6,708,573 B1 | 3/2004 | Cohen et al. |
| 6,745,801 B1 | 6/2004 | Cohen et al. |
| 6,786,245 B1 | 9/2004 | Eichelberger et al. |

(Continued)

OTHER PUBLICATIONS

SAE International Surface Vehicle Standard J2601, Fueling Protocols for Light Duty Gaseous Hydrogen Surface Vehicles (Year: 2014).*

*Primary Examiner* — Timothy P. Kelly
*Assistant Examiner* — Christopher M Afful
(74) *Attorney, Agent, or Firm* — Matthew R. Weaver

(57) ABSTRACT

An apparatus for hydrogen dispensing can be configured to generate a display to be output visually to a customer that may use a dispenser to fill a fuel tank with hydrogen fuel. The display can include a graphical user interface or other interface that can show the customer information about the dispensing of fuel that is being provided to the user. This displayed information can include information to indicate an estimated time remaining to fully fill a vehicle's fuel tank so the customer can have visual and/or audible indications for how much longer the customer may have to wait to have the vehicle's fuel tank filled for continued use of the dispenser. This can improve the customer's experience at the fueling station. For instance, embodiments can allow the customer to more effectively use the fueling station and manage his or her time at the fueling station.

20 Claims, 7 Drawing Sheets

(56) References Cited

U.S. PATENT DOCUMENTS

| | | |
|---|---|---|
| 7,028,724 B2 | 4/2006 | Cohen et al. |
| 7,328,726 B2 | 2/2008 | Cohen et al. |
| 7,793,675 B2 | 9/2010 | Cohen et al. |
| 7,921,883 B2 | 4/2011 | Cohen et al. |
| 8,020,589 B2 | 9/2011 | Cohen et al. |
| 8,286,675 B2 | 10/2012 | Farese et al. |
| 8,365,777 B2 | 2/2013 | Farese et al. |
| 8,453,682 B2 | 6/2013 | Bonner et al. |
| 8,899,278 B2 | 12/2014 | Cohen et al. |
| 9,074,730 B2 | 7/2015 | Cohen |
| 9,151,448 B2 | 10/2015 | Cohen et al. |
| 9,261,238 B2 | 2/2016 | Cohen et al. |
| 9,279,541 B2 | 3/2016 | Cohen |
| 9,404,620 B2 | 8/2016 | Cohen |
| 9,863,583 B2 | 1/2018 | Youlio et al. |
| 10,502,649 B1 | 12/2019 | Cohen |
| 10,508,770 B2 | 12/2019 | Cohen et al. |
| 2010/0307636 A1* | 12/2010 | Uemura .................. F17C 5/06 141/4 |

* cited by examiner

APPARATUS AND METHOD FOR HYDROGEN FUEL DISPENSING

FIELD OF THE INVENTION

The innovation relates to apparatuses and methods for hydrogen fuel dispensing.

BACKGROUND OF THE INVENTION

Examples of hydrogen generation and supply systems can be appreciated from U.S. Pat. Nos. 6,401,767, 6,474,078, 6,619,336, 6,708,573, 6,745,801, 6,786,245, 7,028,724, 7,328,726, 7,793,675, 7,921,883, 8,020,589, 8,286,675, 8,365,777, 8,453,682, 8,899,278, 9,074,730, 9,151,448, 9,261,238, 9,279,541, 9,404,620, 9,863,583, 10,502,649, and 10,508,770.

Dispensers of hydrogen fueling stations often only display one or two items to a user at the dispenser that may be using the dispenser to fill a vehicle fuel tank. A display for such a dispenser will often show the dispensing pressure or the mass of fuel dispensed to the customer (e.g. dispensed into the fuel tank of the customer's vehicle). The mass of fuel that is displayed is often provided in metric units of mass (e.g. kilogram, or kg).

SUMMARY

I determined that dispensers for hydrogen fueling often have poorly formatted displays concerning the fuel being dispensed at the dispenser. Often, a dispenser will only show a customer the mass of fuel dispensed and a dispensing pressure. The illustrated dispensing pressure, however, can be hard to appreciate by the typical customer and may refer to a different pressure at different fueling stations. Sometimes the dispensing pressure is a pressure that is determined at the vehicle fuel tank. Other times, the dispensing pressure is an estimate of the pressure in the vehicle fuel tank or a pressure in the dispenser. The lack of a reliable pressure indicator often fails to inform a customer of anything significant to that customer about the fuel dispensing process the operator is using to fill the fuel tank of the customer's vehicle (e.g. car, truck, boat, etc.).

1 determined that even the mass information displayed to a customer is often not helpful to the customer. For example, a dispenser that displays kilograms (kg) dispensed doesn't provide the customer with a number of pieces of information that they would need to understand how much longer the filling of fuel will take to fully fill the fuel tank of the customer's vehicle. The customer may or may not know how many kg their fuel tank holds and is unlikely to know how empty their fuel tank was when the customer arrived at a fueling station dispenser to fill the fuel tank. Nor does the customer know other information, such as arrived a fill rate in kg/unit of time (e.g. kg/s, kg/min or kg/hr). Also, a customer is unlikely to understand the intricacies of hydrogen compressibility which will cause the flow rate in kg/unit of time to decrease as the fill progresses. The fill rate for hydrogen fuel dispensing can function very differently from gasoline or diesel fuel dispensing.

I also determined that a dispenser that displays current pressure is unable to answer the question of how long a fill will take. A customer is not likely to be able to estimate the ending pressure for dispensing. This is particularly true since the target fill pressure is usually a function of the temperature in the tank. Displaying the current pressure on the dispenser can also be disconcerting in some conventional systems since the end pressure that may be displayed can be as high as 80 MPa or more, which might confuse a customer into mistakenly believing that something is wrong, particularly in light of the nominal 70 MPa pressure rating that is often prominently displayed on the dispenser.

I determined that a new apparatus for hydrogen dispensing can utilize a new type of display unit or a new type of graphical user interface (GUI) for a dispenser display that can better communicate information about hydrogen dispensing occurring at a dispenser while it is being used by the customer to fill his or her vehicle's fuel tank. Unlike gasoline or compressed natural gas fueling processes, the information to be displayed for hydrogen fueling is much harder to estimate for an accurate and reliable display. I have determined embodiments for an apparatus for dispensing and methods related to the same that can address such problems and provide displays of relevant, useful information to a customer that is reliable and accurate and can be easily appreciated by a customer. For example, embodiments can be configured to provide a reliable and accurate estimate for time remaining to fill a customer's fuel tank while the customer is dispensing fuel into the fuel tank via a fueling station's dispenser. Conveying this type of information in an accurate, reliable way can improve the customer's experience at the dispenser and allow the customer to better manage the customer's time while filling the fuel tank at the fueling station.

I have determined that a time estimate for use in determining an amount of time remaining for filling a vehicle fuel tank with hydrogen fuel form a dispenser can include one or more of the following estimation components: i. calculate and estimate pressure for the fueling; and ii. utilize empirically derived equation for the estimation on time remaining.

For example, end pressure for the fueling can be calculated using rigorous thermodynamic methods based on actual data, or by using a simplified, empirically derived equation. Examples of different equations that can be utilized for such estimations can depend on the type of hydrogen fuel the hydrogen fueling stations can provide. For instance, hydrogen fuel can be provided as H70 type hydrogen fuel and H35 type hydrogen fuel where the H70 and H35 refer to measures of pressure (e.g. H70 is hydrogen at approximately 70 MPa, or 10,000 psi and H35 is at approximately 35 MPa, or 5,000 psi). Hydrogen fuel type can be accounted for in the end pressure estimates in some embodiments by use of the following calculations, for example:

(1) For H35 hydrogen fuel: End Pressure (MPa)=0.1227*(−0.0266*(35 StartP(MPa))^2+2.5891*(35−StartP(MPa)))+32.313, where "StartP(MPa)" is the starting pressure in Mega Pascal (MPa) and End Pressure (MPa) is the end pressure in MPa; and (2) For H70 hydrogen fuel fueling: End Pressure (MPa)=0.2409*(−0.0149*(70−StartP(MPa))^2+2.0222*(70−StartP(MPa)))+64.435, where "StartP (MPa)" is the starting pressure in Mega Pascal (MPa) and End Pressure (MPa) is the end pressure in MPa.

As an example of utilizing an empirically derived equation for the estimation on time remaining, a J2601 table fill method (which can be the table method defined in the SAE International (SAE) J2601 protocol standard) can be employed. In such embodiments, the remaining time for a fueling can be calculated by the following equation:

Time remaining (min)=(End Pressure (MPa)−Current Pressure (MPa))/Ramp Rate (MPa/min), where EndPressure (MPa) is the vehicle tank end pressure in MPa and the ramp rate is the increase in pressure measured at the vehicle tank in MPa/min.

The current pressure can be the current pressure measured at the vehicle fuel tank, the pressure used to end the fill, or the pressure used for the density calculation from the dispenser, from the vehicle, or calculated from both of those pressures obtained from pressure sensors for the vehicle fuel tank pressure and the dispenser pressure.

As another example of utilizing an empirically derived equation for the estimation on time remaining, the time remaining calculation can use the MC formula method described in the SAE J2601 protocol standard. This can use the same equation as the tables method, but this may not give satisfactory results since the ramp rate can vary so much during an MC formula fill. It might be advantageous to use ramp rate data from recent fills such as an average ramp rate of the past three fills, or maybe the average ramp rate of all fills during the past hour as an input for the ramp rate variable of the time remaining equation when utilizing this estimation technique.

Of course, other embodiments can use multiple time remaining techniques—some based on thermodynamics and others based on empirical driven time remaining equations such as those mentioned above. The times determined from use of these different equations may be averaged or otherwise weighted to provide a time remaining estimate that may be considered to be a more reliable, accurate time remaining estimate.

The determined time remaining that is estimated can also be further revised to provide a displayed estimated time remaining to a customer. For example, a determined time value can be increased by a pre-selected additional time amount (e.g. 5%, 10%, 5 seconds, 1 minute, etc.). This time estimate can be provided to include additional time to try and ensure that the fuel filling always occurs sooner than the actual estimated time that is displayed to the customer so that the customer has the impression that the fuel dispensing went quickly and more effectively than if it finished on time or slightly after the displayed estimated time.

Embodiments can also be configured so that the estimated time display is never shown as going up in time. For example, if a measured pressure goes down unexpectedly or the ramp rate used in calculations decreases, the displayed time remaining may be configured to hold steady and not change instead of showing an increase in time remaining.

Embodiments can also be configured to take into account other aspects of the fuel dispensing that can affect the time needed to fill a fuel tank. For example, the time it can take for leak checks and/or bank switches (e.g. switching fuel sources or storage tank sources for the hydrogen fuel during dispensing of the fuel). In the event leak checks are taken into account, a leak check time factor can be added to an estimated time remaining to account for the leak check process. The leak check time factor can be a pre-determined or pre-selected value that is based on an average of how long such leak checks take, a median value of how long such leak checks may take, or some other empirical based time value for how long such leak checks may take. The pre-selected value for such leak check time factors can be determined based on fueling station performance so the value is fueling station specific or can be based on the performance of a number of different leak checks used at various different fueling stations and/or dispensers. In some situations, at least a number of the leak checks or valve checks can be known to occur in a pre-selected time interval and the number of the remaining leak checks to occur can be multiplied by a leak check factor value for such leak checks to provide a leak check factor total value to incorporate into the determining reaming time estimate.

In some embodiments, a known pre-selected or pre-determined leak check factor can be multiplied by the number of remaining leak checks to be performed during fueling to determine a total remaining leak check time factor to add to the remaining time to determine an estimated overall remaining time for fueling. In other situations, each leak check (or at least some of the different leak checks) can have its own pre-selected leak check time factor value. For example, a first leak check that may occur at a pressure of 40 MPa (or a first leak check pressure in a range of 30 MPa-50 MPa) can have a larger pre-selected time factor value than a second leak check that may occur at a pressure of 60 MPa (or a second leak check pressure in a range of 50 MPa and 70 MPa), so those leak checks can have different associated pre-selected leak check time factor values to be added to an estimated time remaining for filling a fuel tank. The estimated remaining time can also be adjusted to account for the conducted leak check. For instance, during filling, the time remaining can avoid use of the 40 MPa leak check time factor value after that leak check is performed while the 60 MPa leak check time factor value is still applied until that leak check is subsequently performed during estimated time remaining determinations. As another example, the estimated time remaining can be adjusted after a first leak check that may occur at 22 MPa by removing the time allocation for that leak check when updating the estimated remaining time.

In some embodiments, the estimated time remaining can be indicated in other ways. For example, in some embodiments a display of the remaining mass to be fed into a fuel tank can be shown as an indication of time remaining to fully fill the customer's fuel tank. In such embodiments, an amount of fuel left to be fed to a fuel tank can be determined to indicate the estimated time pressure by subtracting the mass of hydrogen fuel dispensed to a fuel tank from the amount of mass available to be fed to the fuel tank to fill the tank that was determined from an initial sensing of the fuel tank prior to dispensing fuel therein. This initial sensing of the fuel tank level and amount of fuel available to be added to the fuel tank before dispensing starts can be based on size or pressure conditions of the fuel tank determined via sensor data or communications with a computer device of the vehicle monitoring the fuel tank status of the vehicle).

As another example, a remaining pressure to be increased during fueling can be shown to indicate a remaining time left for filling of the fuel tank. In such embodiments, the remaining pressure to be displayed can be a target end pressure value that has the measured current pressure value subtracted from that target pressure value to provide a pressure increase value that indicates an amount of time remaining until the pressure reaches the end pressure target value during the filling of the fuel tank (e.g. target end pressure value in MPa–the current pressure value in MPa).

A dispensing apparatus can be configured to include a computer device to facilitate the determination of an estimated time remaining to fill a fuel tank and generate a display and/or audible output to indicate the time remaining to a customer or user. The output can be a visual display provided via a display device (e.g. monitor, liquid crystal display, other type of display, etc.) to which the computer device is connected and/or an audible output provided via one or more speakers to which the computer device is connected. The computer device can include at least one processor connected to a non-transitory computer readable medium (e.g. flash memory, a solid state drive, a hard drive, etc.).

The non-transitory computer readable medium can have code or an application stored thereon that can be run by the processor. The code or application can include instructions that define a time remaining estimation calculation method that is performed by the processor when it runs the code or application. The computer device can also be connected to one or more sensors and/or one or more transceiver units to receive data as input into the estimated time remaining calculation method. That data can be stored in the non-transitory computer readable medium and utilized by the processor when it runs the code or the application. The sensor data can include pressure sensor data and/or mass flow sensor data, for example. The data can also include data received from a computer device of a vehicle being filled or a sensor of the vehicle being filled (e.g. a fuel tank sensor, a computer device of fuel tank monitoring device that is overseeing or monitoring the fuel tank of the vehicle, etc.). The computer device of the dispenser can also be communicatively connectable to a server or other remote computer device, which may support the application or code stored in the non-transitory memory or otherwise host a service utilized by the computer device. Such a remote device can provide code updates, application updates, or other parameter value updates to the dispenser computer device, for example. The communicative connection between these devices can be providable via a wireless network connection or other type of connection (e.g. wireless local area network connection, wide area network connection, etc.). Some embodiments of the hydrogen fueling dispensing apparatus can include an embodiment of this type of telecommunications network and/or communication system. There can also be other network elements (e.g. network nodes, gateways, routers, etc.) that are included in such a system.

Embodiments of the hydrogen fuel dispensing apparatus can also include other elements. For example, embodiments can include a hydrogen fuel storage device, a pump, a fuel control manifold (FCM) and at least one of the dispensers. The pump can be configured to feed hydrogen fuel form one or more storage devices to the FCM for feeding to one or more of the dispensers. Conduits and valves can be provided to facilitate the flow of hydrogen between these elements. There can also be other elements included (e.g. heat exchangers, vaporizers, high pressure storage, control valves, check valves, conduits, pumps, etc.) to facilitate the feeding of hydrogen to one or more dispensers within pre-selected temperature and pressure ranges for feeding into a fuel tank of a vehicle to fill the fuel tank.

An apparatus for hydrogen dispensing is provided. The apparatus can include at least one sensor arranged and positioned to collect measurement data for filling a fuel tank of a vehicle with hydrogen fuel and a computer device communicatively connectable to the at least one sensor. The computer device can include a processor connected to a non-transitory computer readable medium. A display device can be communicatively connected to the computer device to display estimated time remaining indicia to indicate an estimated time remaining to fill the fuel tank based on an estimated time remaining determined by the computer device and update the displayed estimated time remaining indicia as dispensing of hydrogen fuel to the fuel tank occurs based on an updated estimated time remaining determined by the computer device. The computer device can be configured to determine the estimated time remaining via an estimated time remaining process defined by code stored in the non-transitory computer readable medium based on sensor data received from the at least one sensor and the computer device can also configured to determine the updated estimated time remaining based on the sensor data received from the at least one sensor while the fuel tank is being filled with the hydrogen fuel via an updated estimated time remaining process defined by code stored in the non-transitory computer readable medium.

In some embodiments, the estimated time remaining process can include one or more of:

(a) End Pressure=$0.1227*(-0.0266*(35-StartP)^2+ 2.5891*(35-StartP)+32.313$, where "StartP" is a starting pressure in Mega Pascal (MPa) and End Pressure is an end pressure in MPa;

(b) End Pressure=$0.2409*(-0.0149*(70-StartP)^2+ 2.0222*(70-StartP)+64.435$, where "StartP" is the starting pressure in MPa and End Pressure is the end pressure in MPa;

(c) Time remaining=End Pressure−Current Pressure/Ramp Rate, where EndPressure is the fuel tank end pressure in MPa and the Ramp Rate is an increase in pressure measured at the fuel tank in MPa/min;

(d) Pressure Remaining (e.g. in MPa or other pressure units of measure)=End Pressure−Current Pressure;

(e) Mass Remaining (e.g. in kg or pounds)=Amount of mass available to be fed to the fuel tank−Mass of the hydrogen fuel dispensed to the fuel tank; and (f) determining an amount of hydrogen fuel to be fed to the fuel tank to fill the fuel tank and dividing the determined amount of hydrogen fuel to be fed to the fuel tank to fill the fuel tank by a dispenser controlled flow rate value.

Embodiments may utilize only one of options (a)-(f) or a combination of options (a) through (f) (e.g. (a) and (c), (a), (c) and (f), all of (a)-(f), only one of (a)-(f), etc.). For example, in some embodiments, the estimated time remaining process can include one of:

(a) End Pressure=$0.1227*(-0.0266*(35-StartP)^2+ 2.5891*(35-StartP)+32.313$, where "StartP" is a starting pressure in Mega Pascal (MPa) and End Pressure is an end pressure in MPa; and (b) End Pressure=$0.2409*(-0.0149*(70-StartP)^2+ 2.0222*(70-StartP)+64.435$, where "StartP" is the starting pressure in MPa and End Pressure is the end pressure in MPa; and also one of:

(c) Time remaining=End Pressure−Current Pressure/Ramp Rate, where the Ramp Rate is a rate of an increase in pressure measured at the fuel tank in MPa; and (d) Pressure Remaining (e.g. in MPa)=End Pressure−Current Pressure.

Embodiments of the apparatus can also utilize other criteria. For instance, the estimated time remaining process can include adding time to the estimated time remaining to account for performance of leak checks and/or bank switching and the updated estimated time remaining process can also include adding time to the updated estimated time remaining to account for performance of leak checks and/or bank switching. The adding of time to the estimated time remaining to account for the performance of leak checks can include multiplying a pre-determined number of leak checks to be performed during the filling of the fuel tank by a pre-selected leak check performance factor value. The adding of time to the updated estimated time remaining to account for the performance of leak checks can also include multiplying a pre-determined number of leak checks remaining to be performed during the filling of the fuel tank by a pre-selected leak check performance factor value.

The adding of time to the estimated time remaining to account for the performance of leak checks can also (or alternatively) include determining that a first leak check is to occur at a first pre-selected leak check pressure during the filing of the fuel tank and determining a first pre-selected leak check performance time factor value for the first leak check and determining that a second leak check is to occur at a second pre-selected leak check pressure during the filing of the fuel tank and determining a second pre-selected leak check performance time factor value for the second leak check. In some embodiments, the first pre-selected leak check pressure is 40 MPa and the second pre-selected leak check pressure is 60 MPa. In other embodiments, these pressure values may be different. The first pre-selected leak check performance time factor value can be greater than the second pre-selected leak check performance time factor value in some embodiments. For instance, the first pre-selected leak check performance time factor value can be greater than the second pre-selected leak check performance time factor value and the first pre-selected leak check pressure can be less than the second pre-selected leak check pressure. In other embodiments, the values may be the same or similar values or the second pre-selected leak check performance time factor value may be greater than the first pre-selected leak check performance time factor value.

The display can be a monitor. a liquid crystal display, or other type of display device positioned at the dispenser of a fueling station. The dispenser can include a fuel nozzle to connect the dispenser to the fuel tank to fill the fuel tank with the hydrogen fuel. The dispenser can also include a handle that a user can grasp to manipulate the fuel nozzle and position the fuel nozzle in an inlet of the fuel tank.

The computer device of the apparatus can be a computer device positioned at the dispenser or positioned remote from the dispenser. In some embodiments, the computer device can be a server that is positioned remote from the dispenser and is communicatively connected to the display and/or a computer device of the dispenser. In other embodiments, the computer device can be positioned at the dispenser or adjacent to the display.

A method of generating a display of time remaining indicia for a display at a dispenser of a fueling station for filling a fuel tank of a vehicle with hydrogen fuel is also provided. Embodiments of the method can utilize an embodiment of the apparatus for hydrogen dispensing. In some embodiments, the method can include determining an estimated time remaining based on sensor data received from one or more sensors for generation of the time remaining indicia for display at the dispenser. The estimated time remaining can be determined based on at least one of:
  (a) End Pressure=$0.1227*(-0.0266*(35-StartP)^2+2.5891*(35-StartP)+32.313$, where "StartP" is a starting pressure in Mega Pascal (MPa) and End Pressure is an end pressure in MPa;
  (b) End Pressure=$0.2409*(-0.0149*(70-StartP)^2+2.0222*(70-StartP)+64.435$, where "StartP" is the starting pressure in MPa and End Pressure is the end pressure in MPa;
  (c) Time remaining=End Pressure−Current Pressure/ Ramp Rate, where EndPressure is the fuel tank end pressure in MPa and the Ramp Rate is an increase in pressure measured at the fuel tank in MPa/min;
  (d) Pressure Remaining (e.g. in MPa)=End Pressure−Current Pressure;
  (e) Mass Remaining (e.g. in kg)=Amount of mass available to be fed to the fuel tank−Mass of the hydrogen fuel dispensed to the fuel tank; and
  (f) determining an amount of hydrogen fuel to be fed to the fuel tank to fill the fuel tank and dividing the determined amount of hydrogen fuel to be fed to the fuel tank to fill the fuel tank by a dispenser controlled flow rate value.

The method can also include other steps or features. For instance, the method can also include determining an updated estimated time remaining for generation of updated time remaining indicia for display at the dispenser based on sensor data received from the one or more sensors while the fuel tank is being filled with the hydrogen fuel via an updated estimated time remaining process. The one or more sensors can include at least one sensor of the dispenser and/or at least one sensor of the vehicle fuel tank. Vehicle fuel tank sensor data can be read via a reader or transceiver (e.g. an infrared reader or other type of receiver, etc.).

In some embodiments, the updated estimated time remaining process can include one of:
  (a) End Pressure=$0.1227*(-0.0266*(35-StartP)^2+2.5891*(35-StartP)+32.313$, where "StartP" is a starting pressure in Mega Pascal (MPa) and End Pressure is an end pressure in MPa; and
  (b) End Pressure=$0.2409*(-0.0149*(70-StartP)^2+2.0222*(70-StartP)+64.435$, where "StartP" is the starting pressure in MPa and End Pressure is the end pressure in MPa; and also one of:
  (c) Time remaining=End Pressure−Current Pressure/ Ramp Rate, where the Ramp Rate is a rate of an increase in pressure measured at the fuel tank in MPa; and
  (d) Pressure Remaining (e.g. in MPa)=End Pressure−Current Pressure.

In some embodiments, the updated estimated time remaining process can also include adding time to the updated estimated time remaining to account for performance of leak checks and/or bank switching. Also, the determining of the estimated time remaining can include adding time to the estimated time remaining to account for performance of leak checks and/or bank switching.

The adding of time to the updated estimated time remaining to account for the performance of leak checks can include multiplying a pre-determined number of leak checks remaining to be performed during the filling of the fuel tank by a pre-selected leak check performance factor value and the adding time to the estimated time remaining to account for performance of leak checks and/or bank switching can include multiplying a pre-determined number of leak checks to be performed during the filling of the fuel tank by a pre-selected leak check performance factor value.

The adding of time to the updated estimated time remaining to account for the performance of leak checks can also (or alternatively), include determining whether a first leak check has yet occurred at a first pre-selected leak check pressure during the filing of the fuel tank and determining a first pre-selected leak check performance time factor value for the first leak check when the first leak check has not yet occurred and also determining whether a second leak check has yet to occur at a second pre-selected leak check pressure during the filing of the fuel tank and determining a second pre-selected leak check performance time factor value for the second leak check when the second leak check has not yet occurred. The adding of time to the initial estimated time remaining to account for the performance of leak checks can also (or alternatively), include determining that a first leak check is to occur at a first pre-selected leak check pressure during the filing of the fuel tank and determining a first pre-selected leak check performance time factor value for the first leak check and also determining that a second leak check is to occur at a second pre-selected leak check pressure during the filing of the fuel tank and determining a second pre-selected leak check performance time factor value for the second leak check. In such embodiments, the first pre-selected leak check performance time factor value can be greater than the second pre-selected leak check performance time factor value and the first pre-selected leak check pressure can be less than the second pre-selected leak check pressure.

A non-transitory computer readable medium having code stored thereon that defines a method that is performed by a computer device when a processor of the computer device runs the code is also provided. Embodiments can be configured so that an above mentioned embodiment of the method can be performed. Other embodiments can be configured so that the method defined by the code that is performed include determining an estimated time remaining to fill a vehicle fuel tank with hydrogen fuel based on sensor data received from at least one sensor, communicating with a display device at a dispenser to generate estimated time remaining indicia to display at the display device based on the determined estimated time remaining to fill the vehicle fuel tank with the hydrogen fuel, determining an updated estimated time remaining to fill the vehicle fuel tank with hydrogen fuel based on sensor data received from the at least one sensor while the vehicle fuel tank is being filled with fuel, and communicating with the display device at the dispenser to generate updated estimated time remaining indicia to display at the display device based on the determined updated estimated time remaining to fill the vehicle with the hydrogen fuel.

The computer device can be communicatively connected to the display device and can also be communicatively connectable to the at least one sensor (e.g. via a reader, receiver, transceiver, etc.). At least one of the at least one sensor can include at least one sensor of the dispenser and/or at least one sensor of the vehicle fuel tank.

It should be appreciated the embodiments of the non-transitory computer readable medium can also include code that defines the method so that the method includes other steps as discussed herein. For instance, the updated estimated time remaining can be determined by adding time to the updated estimated time remaining to account for performance of leak checks and/or bank switching. Also, the determining of the estimated time remaining can include adding time to the estimated time remaining to account for performance of leak checks and/or bank switching.

The adding of time to the updated estimated time remaining to account for the performance of leak checks can include multiplying a pre-determined number of leak checks remaining to be performed during the filing of the fuel tank by a pre-selected leak check performance factor value and the estimated time remaining can be determined to account for performance of leak checks and/or bank switching by multiplying a pre-determined number of leak checks to be performed during the filing of the fuel tank by a pre-selected leak check performance factor value.

The adding of time to the updated estimated time remaining to account for the performance of leak checks defined by the code stored in the non-transitory computer readable medium can also (or alternatively), include determining that a first leak check is to occur at a first pre-selected leak check pressure during the filing of the fuel tank and determining a first pre-selected leak check performance time factor value for the first leak check and also determining that a second leak check is to occur at a second pre-selected leak check pressure during the filing of the fuel tank and determining a second pre-selected leak check performance time factor value for the second leak check. The adding of time to the estimated time remaining to account for the performance of leak checks can also (or alternatively) be defined by the code stored in the non-transitory computer readable medium to include determining that a first leak check is to occur at a first pre-selected leak check pressure during the filing of the fuel tank and determining a first pre-selected leak check performance time factor value for the first leak check and also determining that a second leak check is to occur at a second pre-selected leak check pressure during the filing of the fuel tank and determining a second pre-selected leak check performance time factor value for the second leak check. In such embodiments, the first pre-selected leak check performance time factor value can be greater than the second pre-selected leak check performance time factor value and the first pre-selected leak check pressure can be less than the second pre-selected leak check pressure.

For all embodiments of the apparatus, method, and non-transitory computer readable medium, it should be appreciated that that the updated estimated time remaining process can be repeated multiple times in pre-selected cycles or pre-selected cycle time intervals. For example, the updated estimated time remaining process can be repeated after a pre-selected updating time cycle interval has passed since the initial updated estimate time remaining value was determined. The pre-selected updating time cycle interval that is utilized can be the same for each and every cycle or can be adjusted for different cycles based on a determined fuel tank filled capacity threshold. For instance, after the fuel tank is determined to be at a filled capacity of 90% or about 90% (e.g. 85%-93% full), the pre-selected updating time cycle interval can be reduced in time so that the frequency of the updating for the estimated time remaining increases (e.g. occurs more often). As another example, after the fuel tank is determined to be at a first filled capacity (e.g. 50% full), the pre-selected updating time cycle interval can be reduced in time to from a first pre-selected updating time cycle interval to a shorter second pre-selected updating time cycle interval so that the frequency of the updating for the estimated time remaining increases (e.g. occurs more often). After the fuel tank is determined to be at a second filled capacity (e.g. 75% full), the pre-selected updating time cycle interval can be reduced in time from the second pre-selected updating time cycle interval to a shorter third pre-selected updating time cycle interval so that the frequency of the updating for the estimated time remaining increases yet again (e.g. occurs more often). After the fuel tank is determined to be at a third filled capacity (e.g. a value that corresponds to the tank being 85%-92% full), the pre-selected updating time cycle interval can be reduced in time from the third pre-selected updating time cycle interval to a shorter fourth pre-selected updating time cycle interval so that the frequency of the updating for the estimated time remaining increases yet again (e.g. occurs more often).

Examples of such embodiments can include configurations of a computer device for determining an initial estimated time remaining based on sensor data received from one or more sensors for generation of initial time remaining indicia for display at the dispenser and also subsequently determining updated estimated time remaining values for generation of updated estimated time remaining indicia to replace the displayed initial time remaining indicia during the fueling of a vehicle fuel tank and/or a previously generated updated estimated time remaining indicia. The initial estimated time remaining can be determined based on at least one of:

(a) End Pressure=0.1227*(−0.0266*(35−StartP)^2+ 2.5891*(35−StartP)+32.313, where "StartP" is a starting pressure in Mega Pascal (MPa) and End Pressure is an end pressure in MPa;
(b) End Pressure=0.2409*(−0.0149*(70−StartP)^2+ 2.0222*(70−StartP)+64.435, where "StartP" is the starting pressure in MPa and End Pressure is the end pressure in MPa;
(c) Time remaining=End Pressure−Current Pressure/Ramp Rate, where EndPressure is the fuel tank end pressure in MPa and the Ramp Rate is an increase in pressure measured at the fuel tank in MPa/min;
(d) Pressure Remaining (e.g. in MPa)=End Pressure−Current Pressure;
(e) Mass Remaining (e.g. in kg)=Amount of mass available to be fed to the fuel tank−Mass of the hydrogen fuel dispensed to the fuel tank; and
(f) determining an amount of hydrogen fuel to be fed to the fuel tank to fill the fuel tank and dividing the determined amount of hydrogen fuel to be fed to the fuel tank to fill the fuel tank by a dispenser controlled flow rate value.

The computer device can also be configured for determining an updated estimated time remaining for generation of updated time remaining indicia for display at the dispenser that can replace the initial time remaining indicia based on sensor data received from the one or more sensors while the fuel tank is being filled with the hydrogen fuel via an updated estimated time remaining process that is performed repeatedly in pre-selected updating time cycle intervals until the vehicle fuel tank is filled and completed or fueling is otherwise stopped and completed (e.g. a user stops fueling before the tank is full and completes the fueling process). The updated estimated time remaining process performed in each cycle can include one or more of:
(a) End Pressure=0.1227*(−0.0266*(35−StartP)^2+ 2.5891*(35−StartP)+32.313, where "StartP" is a starting pressure in Mega Pascal (MPa) at a time the updated estimated time remaining process is initiated and End Pressure is an end pressure in MPa;
(b) End Pressure=0.2409*(−0.0149*(70−StartP)^2+ 2.0222*(70−StartP)+64.435, where "StartP" is the starting pressure in MPa at a time the updated estimated time remaining process is initiated and End Pressure is the end pressure in MPa;
(c) Time remaining=End Pressure−Current Pressure/Ramp Rate, where EndPressure is the fuel tank end pressure in MPa and the Ramp Rate is an increase in pressure measured at the fuel tank in MPa/min;
(d) Pressure Remaining (e.g. in MPa)=End Pressure−Current Pressure;
(e) Mass Remaining (e.g. in kg)=Amount of mass available to be fed to the fuel tank−Mass of the hydrogen fuel dispensed to the fuel tank; and
(f) Determining an amount of hydrogen fuel to be fed to the fuel tank to fill the fuel tank and dividing the determined amount of hydrogen fuel to be fed to the fuel tank to fill the fuel tank by a dispenser controlled flow rate value.

As discussed above, the determining of an updated estimated time remaining for generation of updated time remaining indicia can also include adding time to the updated estimated time remaining to account for performance of leak checks and/or bank switching. Also, the determining of the initial estimated time remaining can include adding time to the estimated time remaining to account for performance of leak checks and/or bank switching. Any of the above mentioned approaches for adding time to account for leak checks can be utilized alone or in combination to add time to the updated estimated time remaining for generation of the updated time remaining indicia or initial estimated time remaining for generation of the initial time remaining indicia. The added time for leak checks and/or bank switching can be included in each cycle for the updated estimated time remaining process and can be adapted so that the added time is reduced after different leak checks are completed during the fueling process.

Also, the pre-selected cycle time intervals for the updated estimated time remaining process that is utilized can be the same for each and every cycle or can be adjusted for different cycles based on a determined fuel tank filled capacity threshold. For instance, after the fuel tank is determined to be at a filled capacity of 90% or about 90% (e.g. 85%-93% full), the pre-selected updating time cycle interval can be reduced in time so that the frequency of the updating for the estimated time remaining increases (e.g. occurs more often). As another example, after the fuel tank is determined to be at a first filled capacity (e.g. 50% full), the pre-selected updating time cycle interval can be reduced in time to from a first pre-selected updating time cycle interval to a shorter second pre-selected updating time cycle interval so that the frequency of the updating for the estimated time remaining increases (e.g. occurs more often). After the fuel tank is determined to be at a second filled capacity (e.g. 75% full), the pre-selected updating time cycle interval can be reduced in time from the second pre-selected updating time cycle interval to a shorter third pre-selected updating time cycle interval so that the frequency of the updating for the estimated time remaining increases yet again (e.g. occurs more often). After the fuel tank is determined to be at a third filled capacity (e.g. a value that corresponds to the tank being 85%-92% full), the pre-selected updating time cycle interval can be reduced in time from the third pre-selected updating time cycle interval to a shorter fourth pre-selected updating time cycle interval so that the frequency of the updating for the estimated time remaining increases yet again (e.g. occurs more often).

Other details, objects, and advantages of my apparatuses for hydrogen dispensing, display units for hydrogen dispensing, graphical user interfaces for hydrogen dispensing, and methods of making and using the same will become apparent as the following description of certain exemplary embodiments thereof proceeds.

BRIEF DESCRIPTION OF THE DRAWINGS

Exemplary embodiments of apparatuses for hydrogen dispensing, display units for hydrogen dispensing, graphical user interfaces for hydrogen dispensing, and methods of making and using the same are shown in the drawings included herewith. It should be understood that like reference characters used in the drawings may identify like components.

DETAILED DESCRIPTION

Figure 1:
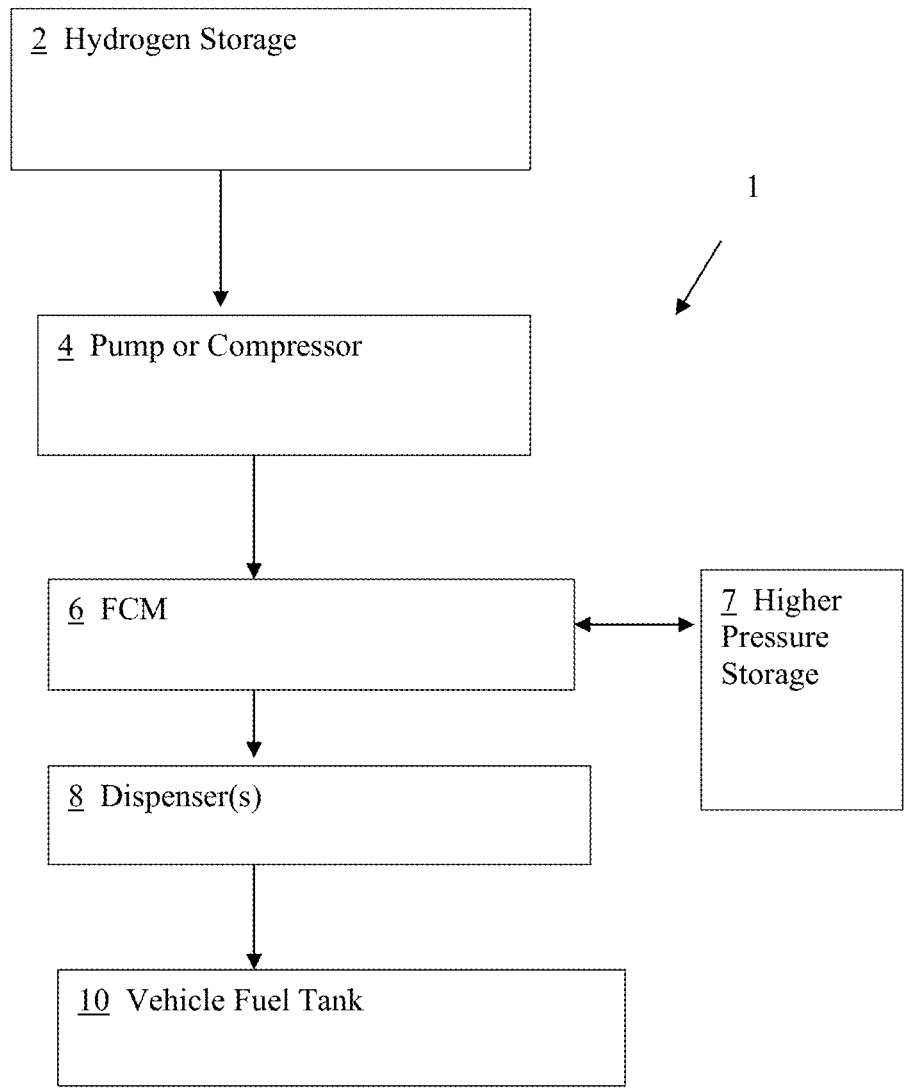
FIG. 1 is a schematic block diagram of a first exemplary embodiment of a hydrogen fuel dispensing and storage apparatus that includes an exemplary embodiment of a hydrogen dispensing apparatus.
Figure 2:
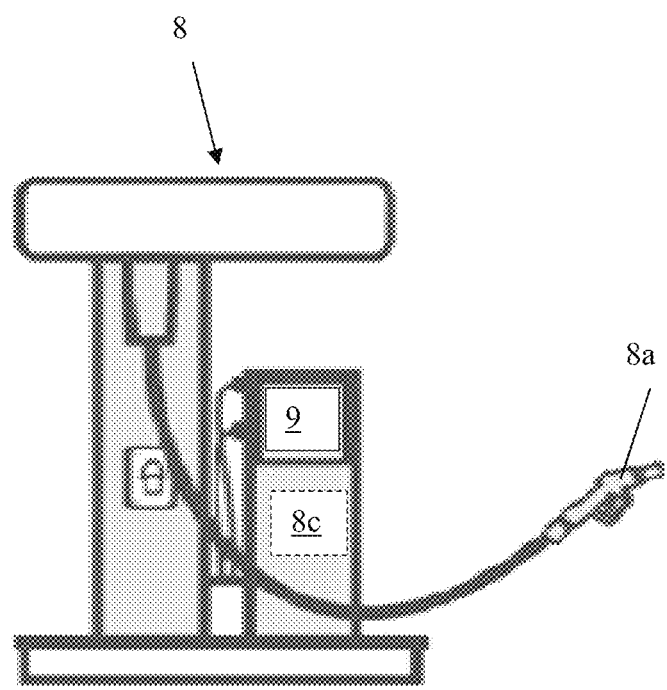
FIG. 2 is a perspective view of an exemplary embodiment of the hydrogen dispensing apparatus 8 included in the first exemplary embodiment of a hydrogen fuel dispensing and storage apparatus.
Figure 3:
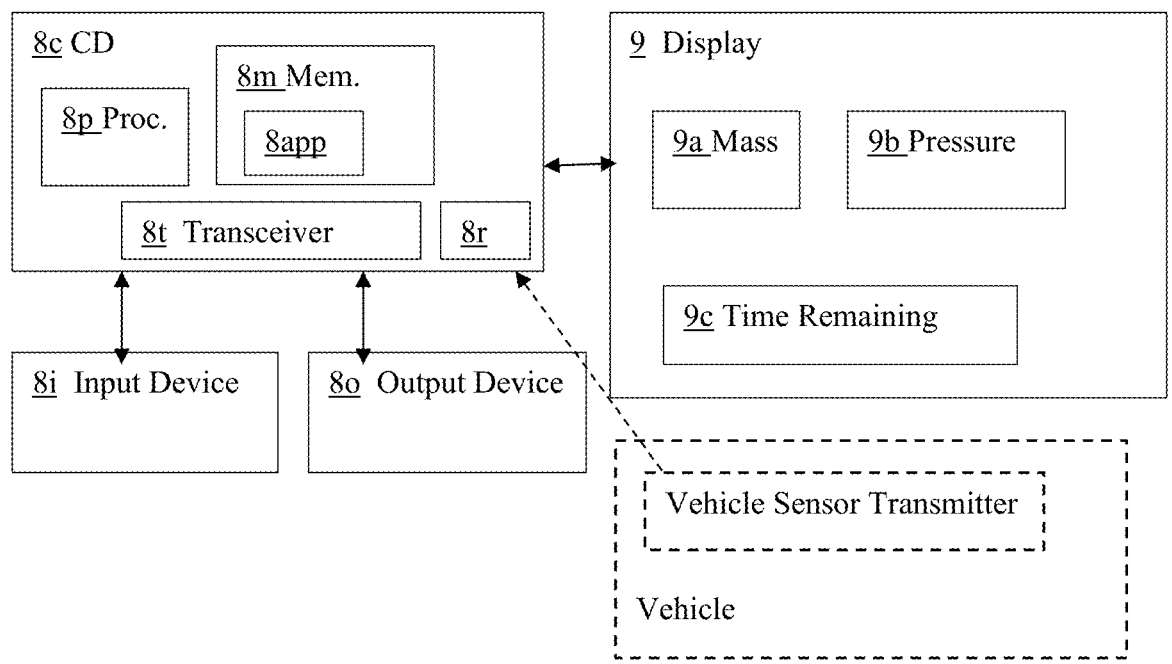
FIG. 3 is a schematic block diagram illustrating an exemplary computer device (CD) of the hydrogen dispensing apparatus included in the first exemplary embodiment of a hydrogen fuel dispensing and storage apparatus shown in FIG. 1. A vehicle sensor transmitter of a vehicle that can send sensor data to a reader 8r of the apparatus is shown in broken line in FIG. 3 as well. The vehicle sensor transmitter can also transmit other data about the vehicle fuel tank such as the size of the fuel tank (e.g. volume of the tank).
Figure 4:
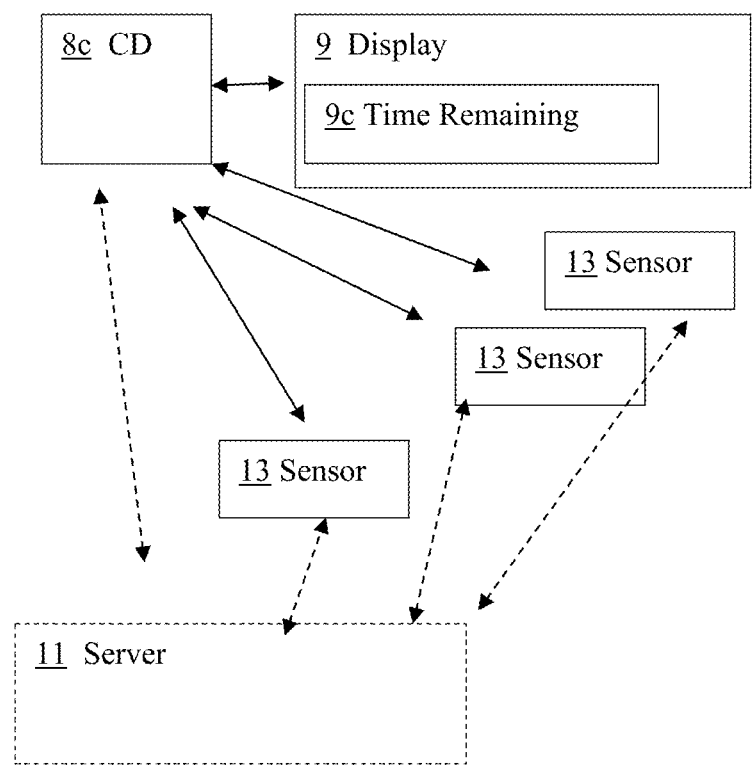
FIG. 4 is an exemplary block diagram of a communication system for the hydrogen dispensing apparatus.
Figure 5:
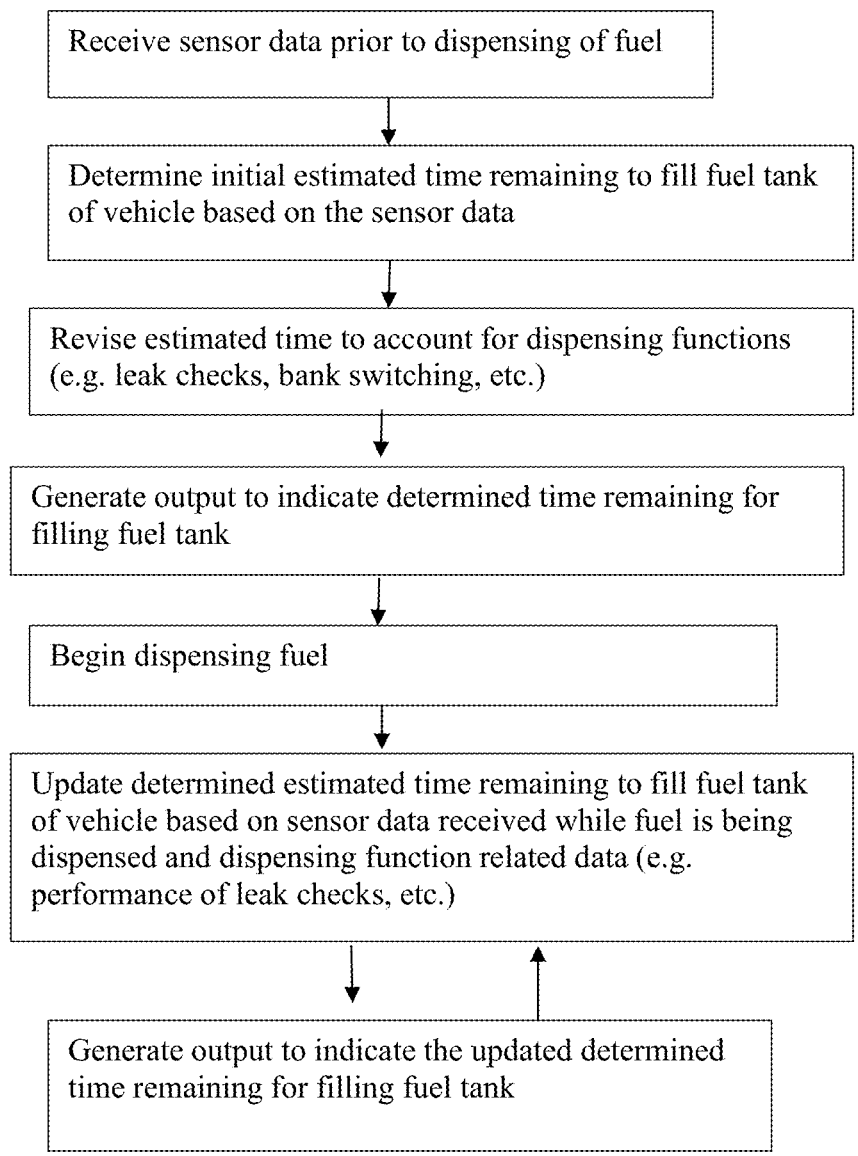
FIG. 5 is a flow chart illustrating an exemplary time remaining estimation calculation method that can be performed when a processor of the computer device 8c of a dispenser runs code or an application stored in memory of the device or a server 11 that is communicatively connected to a computer device 8c and/or display 9 runs code or an application stored in memory of the device.

Referring to FIGS. 1-7, a hydrogen fuel dispensing apparatus can include hydrogen storage 2 that is configured to store liquid hydrogen therein at a pre-selected pressure. Hydrogen storage can include a storage unit that includes one or more vessels that store the liquid hydrogen therein at a pre-selected storage temperature and pre-selected storage pressure. The stored hydrogen can be liquid hydrogen that is stored at a cryogenic temperature. For example, the temperature of the stored liquid hydrogen can be in a temperature range of −255° C. to −100° C., less than −255° C., in a range of −60° C. to −255° C., within a range of −253° C. and −240° C., or within another suitable temperature range that is able to keep the hydrogen in a liquid form while it is within a pre-selected storage pressure range. The pressure of the stored liquid hydrogen can be in a range of more than 0.9 MPa to 1.2 MPa, in a range of greater than 0.9 MPa and less than 1.2 MPa, between 0.9 MPa to 1.175 MPa, or in another suitable pressure range selected to maintain the liquid hydrogen in liquid form (e.g. 0.2 MPa to 1 MPa, etc.). Hydrogen may also be stored as a supercritical fluid at pressures as low as 0.7 MPa or as high as 70 MPa. The hydrogen can be manufactured on site, or delivered via pipeline, or via tube trailers.

The hydrogen stored in the at least one storage tank 3 can be hydrogen that is at least 99.97 mole percent (mol %) hydrogen in some embodiments. The stored hydrogen can also include a concentration of impurities of up to 300 ppm (e.g. ranging from 0 ppm to 300 ppm) in some embodiments. The up to 300 ppm of impurities (e.g. impurities ranging from 0 ppm to 300 ppm as a cumulative total) can include water being present in a range of 0 ppm to 5 ppm, total hydrocarbons except for methane or other single carbon equivalent hydrocarbons being within a range of 0 ppm to 2 ppm, oxygen being within a range of 0 ppm to 5 ppm, methane being within a range of 0 ppm to 100 ppm, helium being within a range of 0 ppm to 300 ppm, nitrogen being within a range of 0 ppm to 300 ppm, argon being within a range of 0 ppm to 300 ppm, carbon dioxide being in a range of 0 ppm to 2 ppm, carbon monoxide being in a range of 0 ppm to 0.2 ppm, total sulfur compounds being in a range of 0 ppm to 0.004 ppm, formaldehyde being in a range of 0 ppm to 0.2 ppm, formic acid being in a range of 0 ppm to 0.2 ppm, ammonia being in a range of 0 ppm to 0.1 ppm, and halogenated compounds being up in a range of 0 ppm to 0.05 ppm.

The stored hydrogen can be fed from the hydrogen storage 2 toward a flow control manifold (FCM) 6. For example, at least one pump or compressor 4 can be positioned to drive a flow of hydrogen from the hydrogen storage 2 to the FCM 6 via a hydrogen feed conduit arrangement. The FCM 6 can be fluidly connected to compressed gas storage, which can be a type of higher pressure storage 7, and also to one or more dispensers 8 of a hydrogen dispensing apparatus at a fueling station for being dispensed into a vehicle fuel tank 10. The vehicle fuel tank can be a fuel tank of a. car, truck, boat, industrial vehicle, construction vehicle (e.g. dump truck, bulldozer, etc.), mining vehicle (e.g. excavator), or other type of vehicle. A hydrogen dispenser feed conduit can be positioned to feed the hydrogen from the FCM 6 to the one or more dispensers 8. Each dispenser 8 can include a fuel dispensing nozzle 8a for fluidly connecting the dispenser 8 to the vehicle fuel tank so that the hydrogen fuel can be fed from the dispenser to the vehicle fuel tank 10.

There can also be higher pressure storage 7 that is in fluid communication with the FCM 6 to receive hydrogen from the FCM 6 for storage of the hydrogen at the higher pressure (e.g. 70 MPa) after the hydrogen pressure is increased via the pump or compressor 4. The higher pressure storage 7 can maintain the hydrogen therein at a second pressure that is higher than the first pressure of the one or more vessels of the unit for hydrogen storage 2. The pressure for this higher pressure storage can be set to be higher than the pressure that a vehicle tank is to be maintained to help facilitate the dispensing of hydrogen into the tank via the FCM 6 and/or dispenser 8. The FCM 6 can also receive hydrogen from the higher pressure storage 7 for feeding toward the dispenser 8.

The FCM 6 can be in fluid connection with one or more dispensers 8 of a fuel dispensing system for providing the hydrogen to the dispensers for dispensing into at least one fuel tank of one or more vehicles or other devices. The FCM 6 can be configured to distribute the hydrogen to one or more dispensers 8 of a fuel station at the same time for providing hydrogen to the dispensers for feeding fuel into fuel tanks of different vehicles or other devices positioned near the dispensers 8 receiving the hydrogen. The feeding of the hydrogen at the dispensers 8 can occur after or before payment for the hydrogen has been provided at the fuel station or a fuel station dispenser kiosk.

As may best be appreciated from FIGS. 2-7, a user or customer can utilize a display 9 along with at least one input device 8i (e.g. button, card reader, keypad, pointer device, microphone, and/or motion detector, etc.) to interact with a computer device 8c of the dispenser to facilitate the dispensing of hydrogen fuel to the vehicle fuel tank 10. The display 9 can be a type of output device or input/output device that is communicatively connected to a processor 8p of the computer device 8c (the computer device 8c can also be referred to as computer device, CD, and the processor 8p can be referred to as processor, Proc.). The computer device 8c can also be connected to at least one other output device 8o for generating other output to a user (e.g. printer for printing a receipt or other output, a touch screen display that functions as a customer input/output device for payment, a speaker for outputting audible output to a user, etc.).

The display 9 can be configured to display mass indicia 9a indicting the mass of fuel that has been dispensed (Mass), pressure indicia 9b, which can indicating a pressure of the dispensing of fuel to the vehicle fuel tank (Pressure), and indicia for time remaining 9c. The illustrated indicia displayed on the display 9 can be generated based on data that the processor 8p provides to the display 9 via its communicative connection with the display 9. In some embodiments, the display 9 can be a single liquid crystal display or other type of display. In other embodiments, the display 9 can include a plurality of separate displays connected to a housing of a kiosk of the dispenser 8 for providing displays for the mass of fuel that has been dispensed (Mass), pressure indicia 9b for indicating a pressure of the dispensing of fuel to the vehicle fuel tank (Pressure), and indicia for time remaining 9c.

The illustrated mass of fuel that has been dispensed and pressure indicia (9a, 9b) can be generated by the computer device 8c based on sensor data received from one or more sensors 13 (e.g. at least one sensor, at least two sensors, at least three sensors, etc.). The sensor data on which the estimated time remaining indicated by the time remaining indicia 9c can be based on sensor data transmitted by a vehicle sensor transmitter, for example. The vehicle sensor transmitter can emit an infrared signal that output vehicle tank pressure and temperature sensor data that can be read or received by a reader 8r of the computer device 8c. The reader 8c can be an IR receiver or other type of IR reader, for example.

In other situations, the transceiver 8t of the computer device 8c can have a reader or receiver for receiving such a signal or other sensor data transmission. In some embodiments, the vehicle sensor transmitter may transmit data via another type of transmission protocol (e.g. near field communication, Bluetooth, Wi-Fi, etc.) and the transceiver 8t of the computer device 8c can include a receiver that can receive such data via that transmission protocol, for example.

The time remaining indicia 9c can be a time value that is generated based on a determined estimated time remaining. The time value can be displayed in minutes, seconds, or a combination of minutes and seconds (e.g. 1:01 to represent 1 minute and 1 second, or 61 seconds remaining, 0:30 to represent 30 seconds remaining, etc.). The computer device 8c can make this determination based on sensor data it can receive from at least one sensor 13. For instance, the one or more sensors 13 can include at least one sensor 13 positioned in the dispenser 8, dispenser nozzle 8a, and/or at least one sensor of the vehicle having the fuel tank to which fuel is being fed. The one or more sensors 13 can be positioned for monitoring pressure, flow rate, or temperature of the hydrogen fuel being fed to the dispenser 8 or dispensed by the dispenser 8.

For example, the sensors 13 can include a sensor positioned to measure a flow rate of hydrogen fed to the fuel tank, at least one sensor that measures a temperature of the hydrogen, a sensor that measures the pressure of the fuel tank, and/or a sensor that measures a pressure of the dispenser feeding the fuel into the fuel tank. In other embodiments, the one or more sensors 13 can include a single sensor 13 that is configured to measure the pressure of the fuel tank or the pressure of the dispenser while the dispenser feeds hydrogen fuel to the fuel tank to fill the fuel tank.

The computer device 8c can also be configured to select a pressure value for use in calculations or other determinations to be made by the computer device 8c to generate the time remaining indicia 9c or to update the time remaining indicia 9c. For instance, in embodiments where the computer device 8c can receive a pressure value from a sensor 13 of the dispenser and also a pressure of a tank of the vehicle to be filled via a sensor 13 of the vehicle (e.g. sensor data received from a vehicle sensor transmitter), the computer device 8c can be configured to select which pressure value to utilize. The selection methodology employed can be to average the two pressure values, select the tank sensor value, select the dispenser sensor value, or to select the pressure value that is determined to be most accurate based on a comparison of the pressure values received. The accuracy evaluation can be pre-defined so that the selected sensor pressure value that is selected is based on pre-defined criteria that is defined to indicate a most believable pressure value from the pressure sensor data. That selected pressure value may then be used in the determination made for the generation of time remaining indicia 9c. The selection criteria can be utilized for each cycle in which the sensor data is received for updating the time remaining indicia 9c as well.

The computer device 8c can also communicate with at least one other audible output device 8o (e.g. a speaker) for generation of audio output to at least audibly indicate an estimated time remaining in an audible sound (e.g. a voice output via a speaker saying the estimated time in at least one language such as English, Spanish, and/or German). In some embodiments, the display 9 can be a touch screen display that can function as an input/output device. The display 9 can also be considered a type of output device.

The processor 8p of the computer device 8c can be communicatively connected to a non-transitory memory 8m, which can also be referred to as a memory, Mem. The memory 8m can be flash memory, a solid state memory drive, a hard drive, or other type of non-transitory computer readable medium. The memory can include data 8app stored thereon. The data 8app can include code stored thereon and/or an application stored thereon. The data can also include sensor data received from one or more sensors as well as other code or data that can be stored thereon (e.g. a data store, a database, files, etc.).

The memory 8m of the computer device 8c can also include other information stored thereon (e.g. one or more data stores, at least one database, old sensor data, customer data, stored empirical data from prior use of the dispenser 8, etc.). Some of this data or other information can be provided by other devices to which the computer device is connectable. Such communication connections can be provided via at least one transceiver 8t. The at least one transceiver 8t of the computer device 8c can include a wireless network connection transceiver unit, a wired network connection transceiver (e.g. Ethernet card), at least one near field communication transceiver unit (e.g. a Bluetooth transceiver, etc.), and/or a directed connection interface (e.g. direct wire or cable based connection to a payment interface of the dispenser, etc.).

For example, a server 11 can be communicatively connectable to the computer device 8*c* and host one or more services that can be utilized by the computer device 8*c*. Such services can be provided via an application programming interface (API), for example. The server 11 can provide updates to code or software stored in the memory of the computer device, update other data stores stored in the memory, or communicate with the computer device 8*c* to provide data concerning a determined mass of fuel, pressure at which dispensing is occurring, and/or data identifying an estimated time remaining to fill a fuel tank being filled with fuel via the dispenser that the computer device 8*c* can use to determine the estimated time remaining for generation of the time remaining indicia 9*c* for displaying via the display 9. For example, in some embodiments, the server 11 can receive sensor data and other data and communicate with the computer device 8*c* to provide data for generation of the indicia to be displayed at the display 9 for each of the dispensers 8 of a fueling station.

The server 11 can be a type of computer device (CD) that includes hardware. The hardware of the server 11 can include a processor connected to a non-transitory computer readable medium and at least one transceiver unit. The server 11 can be a computer device (e.g. a desktop computer or workstation) that is remote from the computer device 8*c* of the dispenser 8 and is communicatively connected to the computer device(s) 8*c* of the dispenser(s) 8 as well as sensors 13 via at least one network connection, for example. The server 11 can also be connected to other elements. For example, the server 11 can be communicatively connected to an automated process control system for the apparatus for dispensing hydrogen fuel 1 to receive data from that system as well. That data can include some of the sensor data from some sensors 13 or other data. In some embodiments, the server 11 can be the computer device that is configured to receive the sensor data and other data and perform the calculations, determinations and generation of data for updating of the time remaining indicia 9*c* and updating of the time remaining indicia 9*c*.

The computer device 8*c* of a dispenser 8 or server 11 communicatively connected to the computer device 8*c* can be configured to receive sensor data prior to a dispenser 8 dispensing fuel. The sensor data can include pressure sensor data, flow rate sensor data, and data received from the dispenser 8 indicating a user wants to fill a vehicle fuel tank with fuel from the dispenser 8 via the dispenser's nozzle 8*a*. The sensor data can also (or alternatively), include vehicle tank sensor data such as a vehicle tank temperature and pressure data obtained from at least one vehicle tank sensor transmitted to the computer device 8*c* via a vehicle sensor transmitter. This sensor data can be received via a reader 8*r* (e.g. IR receiver, IR reader, etc.) or transceiver 8*t* of the computer device 8*c* as discussed above.

As the dispenser is initialized for fueling, an initial estimated time remaining to fill the vehicle fuel tank can be determined based on the sensor data and a pre-defined estimated time remaining protocol defined in code or an application that is run by a processor of the computer device (e.g. computer device 8*c* of the dispenser or a server 11 connected to a computer device 8*c* of the dispenser 8). The code can also define the sensor data selection process for utilization of a most believable pressure from the received pressure sensor data as discussed herein as well. The initial time estimate that is made can also be revised to account for dispensing functions, such as leak checks, bank switching, or other dispensing related operations to determine a final initial estimated time remaining value. This value can be utilized to generate output for display via a display 9 and/or audible output via an output device 80. The dispenser 8 can then be used to fill the fuel tank with fuel. As the fuel is fed into the fuel tank, the determined estimated time remaining for filling the fuel tank can be adjusted so that it changes based on how the fueling process progresses. For example, the determined estimated time remaining to fill the fuel tank can be updated based on sensor data received while the fuel is being dispensed into the fuel tank as well as dispensing function related data (e.g. performance of periodic leak checks to occur during the fueling process, etc.). The updated determined time remaining can be communicated so that an updated time remaining output is generated for display as time remaining indicia 9*c* via display 9 and/or for audible outputting via an output device 8*o* (e.g. a speaker, etc.).

The updating of the determined time remaining and generation of the updated time remaining indicia can occur continuously or can occur at pre-selected update intervals (e.g. every 1 second, every 10 seconds, every 20 seconds, every minute, a time in the range of 1 second and 30 seconds or 1 second and 1 minute, etc.). If the determination occurs at pre-selected update intervals, the displayed time remaining can show the same time before the next update changes that time, or a timer can be utilized to show the time remaining counting down to a new lower value until the updated determined time is generated. After the updating of the updated time remaining indicia is performed to replace the initially displayed time remaining indicia shown at the start of fueling, the updated estimated time remaining indicia generated by a new, subsequent cycle of the updated estimated time remaining process can replace the previously displayed updated time remaining indicia at a display of the dispenser. The updated estimated time remaining process can be repeated numerous times each cycle until the fueling is completed (e.g. tank is filled or a user stops fueling to complete the fueling process).

For example, when that new updated generated time is generated, the time reaming can be updated to the new time to change the time remaining indicia 9*c* to indicate the newly determined time. The new time remaining indicia 9*c* (e.g. an updated time remaining indicia 9*c*) can adjust how time is displayed as the fuel tank of a vehicle is filled and the time remaining reduces. For instance, the displayed time can start in a format showing minutes and seconds (e.g. 1:23, 07:18, 10:23, etc.) and then change to a format that only shows seconds (e.g. 0:02, 0:15, 1, 4, 15, 5.0, 3.0, etc.). The displayed indicia can also include text to indicate the time (e.g. "min", "sec", etc.).

In a situation where the new time remaining estimated value is higher than the currently shown time remaining or output time remaining, the displayed time remaining can be shown as the same value until the new updated time is arrived at. In such a situation, a difference between the displayed time and determined updated time remaining value can be determined and a counter can be utilized to track when that difference in time has been met while the shown time remaining has not changed. When the displayed time is equivalent to the time that would be remaining based on the updated determined estimated time value, the displayed time remaining can resume reducing in value until the next updated time remaining estimation is made to generate a new updated time remaining value.

Figure 6:
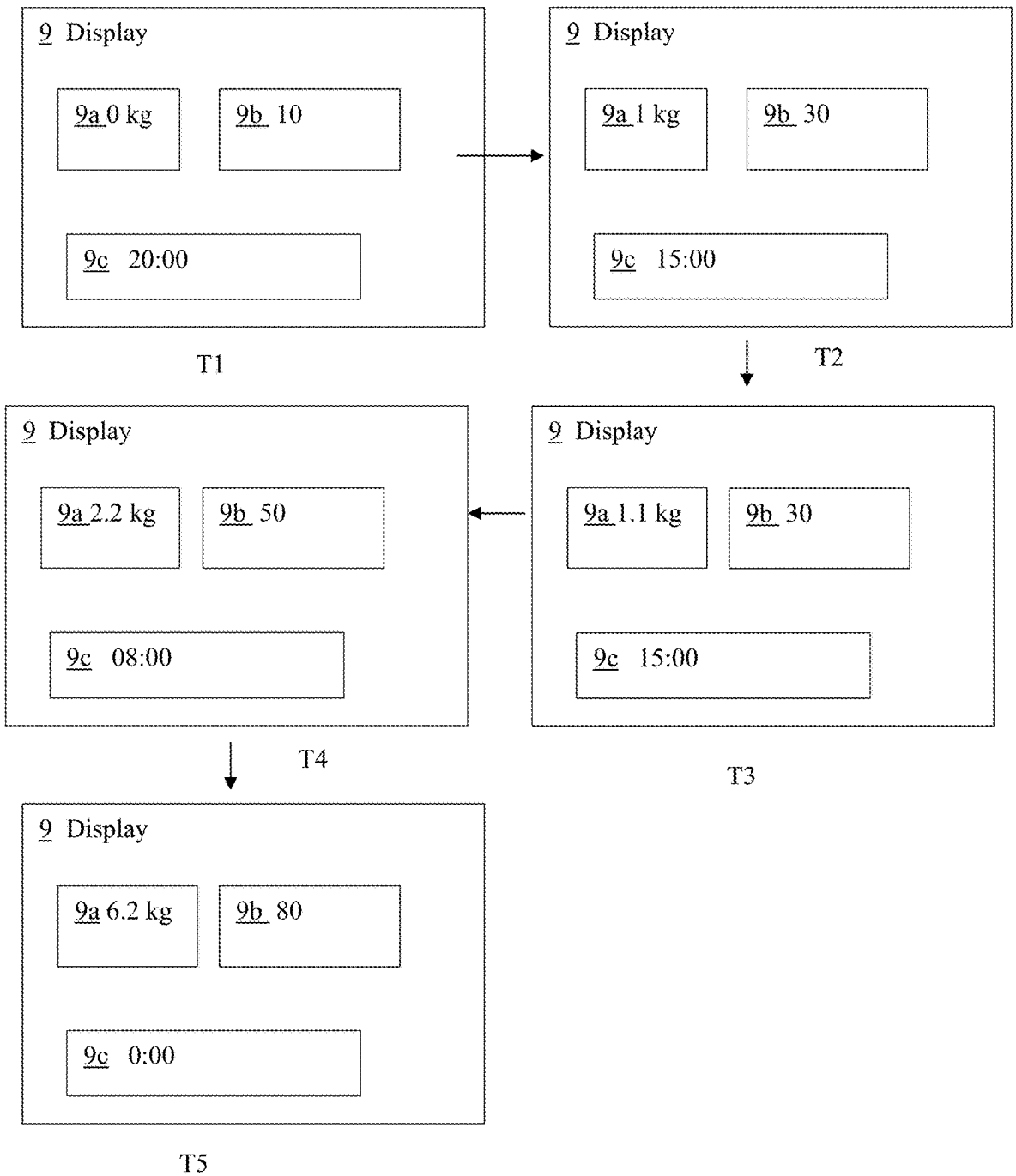
FIG. 6 is a flow chart illustrating an exemplary process in which a dispenser display can be updated to provide an updated estimated time remaining indication as a fuel tank is filled.

FIG. 6 illustrates an example of a sequence of displayed time remaining values to help further illustrate how the displayed estimated time remaining can be initially generated and displayed and subsequently updated as dispensing of fuel into a vehicle fuel tank occurs. For example, at a first time T1, sensor data that includes pressure sensor data, flow rate sensor data, and data received from the dispenser 8 indicating a user wants to fill a vehicle fuel tank with fuel from the dispenser 8 via the dispenser's nozzle 8a can be received. As the dispenser is initialized for fueling, an initial estimated time remaining to fill the vehicle fuel tank can be determined based on the sensor data and a pre-defined estimated time remaining protocol defined in code or an application that is run by a processor of the computer device (e.g. computer device 8c of the dispenser or a server 11 connected to a computer device 8c of the dispenser 8). The initial time estimate can be revised to account for dispensing functions, such as leak checks, bank switching, or other dispensing related operations to determine a final initial estimated time remaining value. This value can be utilized to generate output for display via a display 9 and/or audible output via an output device 8o at the first time T1. Sensor data indicating the pressure at the fuel tank or the dispenser can also be used to display pressure indicia 8b and a mass of fuel fed to the fuel tank can be displayed as 0 kg as mass indicia 9a as no fuel has yet been fed to the fuel tank at the first time T1.

The dispenser 8 can then be used to fill the fuel tank with fuel. As the fuel is fed into the fuel tank, the determined estimated time remaining for filling the fuel tank can be adjusted so that it changes based on how the fueling process progresses. For example, the determined estimated time remaining to fill the fuel tank can be updated at a second time T2 that occurs after the first time T1 based on sensor data received while the fuel is being dispensed into the fuel tank as well as dispensing function related data (e.g. performance of periodic leak checks to occur during the fueling process, etc.). The updated determined time remaining can be communicated so that an updated time remaining output is generated for display as time remaining indicia 9c via a display 9 and/or for audible outputting via an output device 8o (e.g. a speaker, etc.).

As the fuel is fed into the fuel tank after the second time T2, the determined estimated time remaining for filling the fuel tank can be adjusted so that it changes based on how the fueling process progresses. For example, the determined estimated time remaining to fill the fuel tank can be updated at a third time T3 that occurs after the second time T2 based on sensor data received while the fuel is being dispensed into the fuel tank as well as dispensing function related data (e.g. performance of periodic leak checks to occur during the fueling process, etc.). The updated determined time remaining can be communicated so that an updated time remaining output is generated for display as time remaining indicia 9c via a display 9 and/or for audible outputting via an output device 8o (e.g. a speaker, etc.). For the example shown in FIG. 6, the updated determined time remaining may have been the same time as the displayed time remaining or a greater time than what was shown at the second time T2. In such a situation, the displayed time remaining may be shown as non-moving until the difference between the updated time remaining and the previously displayed time remaining is eliminated. Thereafter, the displayed time can resume counting downwardly until a new updated estimated time remaining is determined at a subsequent fourth time T4 that occurs after the third time T3.

At a fifth time T5, the fuel tank can be determined to be filled and dispensing of fuel can be stopped. The estimated time remaining indicia 9c can be determined to be 0 seconds or 0 minutes at that time (e.g. 0, 0:00, etc.) The mass of fuel dispensed that is determined from pressure and/or mass flow sensor data can be displayed as mass indicia 9a and the pressure at the dispenser 8 or fuel tank at the conclusion of the dispensing can be shown as pressure indicia 9b as well.

As noted above, the updating of the determined time remaining and generation of the updated time remaining can occur continuously as time progresses from the first time T1 to the fifth time T5 or can occur at pre-selected update intervals T2-T5 after the first time T1. If the determination occurs at pre-selected update intervals, the displayed time remaining can show the same time before the next update changes that time, or a timer can be utilized to show the time remaining counting down to a new lower value until the updated determined time is generated. When that new updated determined time is generated, the time reaming can be updated to the new time. The frequency of updating of the estimated time remaining indicia 9c that occurs in times T2-T5 can be adjusted based on how filled the vehicle tank is discussed herein as well. For example, the frequency at which sensor data is utilized to update the estimated time remaining indicia 9c can be increased (e.g. the cycle time for periodic updating can be shortened) so that the estimated time remaining indicia 9c is updated more frequently after the vehicle tank is at or above a pre-selected filled threshold. This threshold value can be selected so it this increased rate of updating occurs when the fuel tank is about 90% full, or another pre-selected filled threshold value can also be used. In yet other embodiments, there can be multiple thresholds corresponding to different tank filled capacities that correspond to an adjustment in the frequency at which the estimated time remaining indicia 9c is updated so that this updating occurs progressively more frequently as the vehicle tank is filled (e.g. there may be a first threshold for about a 50% filled tank capacity, a second threshold for about a 75% filled capacity, and a third threshold for about a 90% filled capacity). This change in the frequency for updating the determined estimated time remaining indicia 9c can help provide more accurate estimated time remaining indicia 9c displays as the fill rate of a tank may change more often (e.g. the fill rate may progressively slow) as the tank becomes filled.

In a situation where the new time remaining estimated value is higher than the currently shown time remaining or output time remaining, the displayed time remaining can be shown as the same value until the new updated time is arrived at in some embodiments. In such a situation, a difference between the displayed time and determined updated time remaining value can be determined and a counter can be utilized to track when that difference in time has been met while the shown time remaining has not changed. When the displayed time is equivalent to the time that would be remaining based on the updated determined estimated time value to indicate when the displayed time remaining can resume reducing in value until the next updated time remaining estimation is made to generate a new updated time remaining value.

The mass of fuel fed into the fuel tank displayed as mass indicia 9a and the pressure measured at the dispenser 8 or fuel tank can be updated continuously or periodically via determinations that are made based on temperature sensor data, pressure sensor data and/or mass flow data received from sensors 13. Such sensor data can include vehicle temperature and pressure sensor data received from a vehicle sensor transmitter as discussed above, for example. The updating of this data can occur continuously or periodically at pre-defined time intervals based on the sensor data. Moreover, the updating of the data for updating generation of estimated time remaining indicia 9c can occur more often (e.g. in shorter cycles) as the tank is filled as discussed herein as well. The updating of the data can also result in use of the sensor data selection process discussed herein for each cycle so that a most believable value is utilized for different parameters (e.g. pressure, temperature, dispenser flow rate, etc.).

The estimation for the time remaining can utilize one or more different types of estimation processes. Such estimation processing can be defined by code and/or an application stored in memory of a computer device (e.g. server 11 or computer device 8c of the dispenser) and performed in accordance with a method defined by the code or application when a processor runs the code or application. Below, examples of the time estimation processing are provided. It should be appreciated that embodiments can utilize a combination of such processes that weighs and/or averages the determined estimated values for determining the estimated time remaining value or may only utilize a single one of these processes for determine an estimated time remaining at the outset of fueling at the dispenser 8 and updated estimated time remaining at subsequent times thereafter as the fuel is fed into a fuel tank via the dispenser 8.

Also (and as further discussed herein), at least one additional correction factor can also be added or otherwise incorporated into the estimated time remaining value to make a final determination on the estimated time remaining. The additional correction factor can account for other dispensing factors (e.g. leak checks, bank switching, other dispensing parameters that can effect fueling, etc.).

For example, time estimate methodology that can be employed for use in determining an amount of time remaining for filling a vehicle fuel tank with hydrogen fuel form a dispenser 8 can include (a) at least one calculation of pressure for the fueling and/or (b) at least one empirically derived equation for the estimation on time remaining.

As an example of a type of calculation of pressure for the fueling, an end pressure for the fueling can be calculated using rigorous thermodynamic methods based on actual data, or by using a simplified, empirically derived equation. Examples of different equations that can be utilized for such estimations can depend on the type of hydrogen fuel as some hydrogen fueling stations can provide. For instance, hydrogen fuel can be provided as H70 type hydrogen fuel and H35 type hydrogen fuel where the H70 and H35 refer to measures of pressure (e.g. H70 is hydrogen fuel at approximately 70 MPa, or 10,000 psi and H35 is hydrogen fuel stored for dispensing at approximately 35 MPa, or 5,000 psi). Hydrogen fuel type can be accounted for in the end pressure estimates in such approaches by use of the following calculations, for example:

(1) For H35 hydrogen fuel:
End Pressure (MPa)=$0.1227*(-0.0266*(35-\text{StartP}(\text{MPa}))^2+2.5891*(35-\text{StartP}(\text{MPa})))+32.313$, where "StartP(MPa)" is the starting pressure in Mega Pascal (MPa) and End Pressure (MPa) is the end pressure in MPa; and (2) For H70 hydrogen fuel fueling:
End Pressure (MPa)=$0.2409*(-0.0149*(70-\text{StartP}(\text{MPa}))^2+2.0222*(70-\text{StartP}(\text{MPa})))+64.435$, where "StartP(MPa)" is the starting pressure in Mega Pascal (MPa) and End Pressure (MPa) is the end pressure in MPa.

When such processing is utilized for determining an updated estimated time remaining process, the "StartP (MPa)" value can be a starting pressure at the time the cycle of the updated estimated time process is performed.

As an example of utilizing an empirically derived equation for the estimation on time remaining, a J2601 table fill method (which can be the table method defined in the SAE International (SAE) J2601 protocol standard) can be employed. The remaining time for a fueling can be calculated by the following equation for such an approach:

Time remaining (min)=(End Pressure (MPa)−Current Pressure (MPa))/Ramp Rate (MPa/min), where EndPressure (MPa) is the vehicle tank end pressure in MPa and the ramp rate is the increase in pressure measured at the vehicle tank in MPa/min.

The current pressure referenced in the above equation can be the current pressure measured at the vehicle fuel tank, the pressure used to end the fill, or the pressure used for the density calculation from the dispenser, from the vehicle, or calculated from both of those pressures obtained from pressure sensors for the vehicle fuel tank pressure and the dispenser pressure.

Another example of utilizing an empirically derived equation for the estimation on time remaining is the MC formula method described in the SAE J2601 protocol standard. This can use the same equation as the tables method noted above, but this may not give satisfactory results since the ramp rate can vary so much during an MC formula fill. For such an approach, the ramp rate data from recent fills can be a pre-determined ramp rate that is based on empirical ramp rate data. For instance, the pre-determined ramp rate can be an average ramp rate of the past three fills at the dispenser 8, the average ramp rate of all fills during the past hour at the fueling station, a median ramp rate for the ramp rate of all fills during the past day at the dispenser. The pre-determined ramp rate can be used as an input for the ramp rate variable of the time remaining equation when utilizing this type of estimation technique.

As yet another example, the estimated time remaining to fill the vehicle tank can be determined based on tank volume and density. For instance, the fuel density can be 24 kg/m3 for H35 fuel and 40.2 kg/m3 for H70 fuel to be dispensed to a vehicle tank. In such situations, the total tank rate contents for a particular sized vehicle tank can be determined from the size of the tank and the tank density values (e.g. for a 0.1 m3 tank for an H70 fuel, the full tank capacity can be 0.1*40.2 kg, or 4.02 kg). This target filled tank value can be modified by a safety factor to avoid overfilling of a fuel tank. For example, modification of the determined tank capacity can result in a reduction of the tank size by a pre-selected safety threshold (e.g. 3%, 2%, 1% up to 5%, etc.). For instance, the tank capacity can be modified by the pre-selected safety threshold value to provide a modified tank capacity (e.g. 0.98*4.02 kg for a 2% safety threshold setting can provide a modified tank capacity value of 3.94 kg). The temperature and pressure sensor data for the tank can also be utilized to determine the amount of fuel residing in the tank. For example, a pressure of 10 MPa at a temperature of 15° C. would indicate a density of 7.92 kg/m3 and a 0.1 m3 tank would be holding 0.79 kg of hydrogen fuel. The amount of fuel to be dispensed to the tank can then be determined by subtracting the current quantity of fuel within the tank from the modified tank capacity value. In the above example, that would be 3.94 kg-0.79 kg, which is 3.15 kg. The estimated time remaining can then be determined by dividing this value by a dispenser controlled flow rate value (e.g. 3.15 kg/dispenser flow rate value). If the flow rate value is 2 kg/min in the above example, then the estimated time remaining at the outset of filling the tank would be 3.15/

2=1.57 minutes, or 94 seconds. This time value can be further modified based on leak checks or other factor time estimate parameters as well as discussed herein. This estimated time remaining at the outset may be displayed as the time remaining indicia 9c. This displayed indicia can then be periodically updated to account for updated pressure and temperature sensor data and the filling rate of fuel fed into the tank by the dispenser. For instance, after 1 minute has passed and 2 kg is fed into the tank, the time remaining can be determined to be 1.15/2=0.575 minutes, or 34.5 seconds. This updated time can also be further corrected to account for any remaining leak checks to be performed as discussed herein. This new updated time may then be displayed as the new time remaining indicia 9c.

In such embodiments, the contents of the vehicle tank can be determined by combining the pressure measurement from the dispenser or vehicle sensor, a temperature from the vehicle temperature sensor to determine a density for the fuel in the tank for determining how full the tank is at the outset of dispensing. For example, if the tank is determined to be at 10 MPa and have a temperature of 15° C., then the density known from the Lemmon equation can be 7.92 kg/m3. The use of the Lemmon equation or other density determination equation can be defined in code stored in memory to be run by the processor. In other embodiments, the density values can be pre-defined in a table based on the pressure and temperature data. The database or table can then be cross-referenced based on the pressure and temperature data to identify the density for use in calculations or other method steps to be performed by the processor.

Of course, other embodiments can use multiple time remaining techniques—some based on thermodynamics and others based on empirical driven time remaining equations such as those mentioned above. The times determined from use of these different equations may be averaged or otherwise weighted to provide a time remaining estimate that may be considered to be a more reliable, accurate time remaining estimate. As another option, some embodiments may utilize multiple time estimate techniques and select the estimated time that is highest or lowest for display a time remaining indicia 9c.

The determined time remaining that is estimated can also be further revised to provide a displayed estimated time remaining to a customer. For example, a determined time value can be increased by a pre-selected additional time amount (e.g. 5%, 10%, 5 seconds, 1 minute, etc.). This time estimate can be provided to include additional time to try and ensure that the fuel filling always occurs sooner than the actual estimated time that is displayed to the customer so that the customer has the impression that the fuel dispensing went quickly and more effectively than if it finished on time or slightly after the displayed estimated time.

As noted above, embodiments can also be configured so that the estimated time display is never shown as going up in time. For example, if a measured pressure goes down unexpectedly or the ramp rate used in calculations decreases, the displayed time remaining may be configured to hold steady and not change instead of showing an increase in time remaining.

The time remaining estimation determination process can also be configured to take into account other aspects of the fuel dispensing that can affect the time needed to fill a fuel tank. For example, the time it can take for leak checks and/or bank switches (e.g. switching fuel sources or storage tank sources for the hydrogen fuel during dispensing of the fuel). In the event leak checks are taken into account, a leak check time factor can be added to an estimated time remaining to account for the leak check process. The leak check time factor can be a pre-determined or pre-selected value that is based on an average of how long such leak checks take, a median value of how long such leak checks may take, or some other empirical based time value for how long such leak checks may take. The pre-selected value for such leak check time factors can be determined based on fueling station performance so the value is fueling station specific or can be based on the performance of a number of different leak checks used at various different fueling stations and/or dispensers. In some situations, at least a number of the leak checks or valve checks can be known to occur in a pre-selected time interval and the number of the remaining leak checks to occur can be multiplied by a leak check factor value for such leak checks to provide a leak check factor total value to incorporate into the reaming time estimate.

For instance, a known pre-selected leak check factor or pre-determined leak check factor can be multiplied by the number of remaining leak checks to be performed during fueling to determine a total remaining leak check time factor to add to the remaining time to determine an estimated overall remaining time for fueling. In other situations, each leak check (or at least some of the different leak checks) can have its own pre-selected leak check time factor value. For example, a first leak check that may occur at a pressure of 40 MPa can have a larger pre-selected time factor value than a second leak check that may occur at a pressure of 60 MPa, so those leak checks can have different associated pre-selected leak check time factor values to be added to an estimated time remaining for filling a fuel tank. The estimated remaining time can also be adjusted to account for the conducted leak check (e.g. during filling, the time remaining can avoid use of the 40 MPa leak check time factor value after that leak check is performed while the 60 MPa leak check time factor value is still applied until that leak check is subsequently performed during estimated time remaining determinations). In overall leak check correction value can be determined when the initial time remaining estimate is provided. Such a value can be a summation of the total estimated time the various different leak checks to be performed during a fill of a vehicle fuel tank may take. As those leak checks are performed, the correction factor can be reduced in value to account for the performance of those leak checks (e.g. the time allocated to the performed leak checks can be removed from the initial leak check correction value to reduce that value to account for the performed leak checks).

The leak check time factor aspect of the estimated time remaining calculation can also account for the type of tank being filled. For example, if 35 MPa hydrogen, or H35 hydrogen, is being dispensed, there may be a first leak check at about 22 MPa. That leak check may have a different time allocation factor than a first leak check at 40 MPa that may be utilized when H70 fuel is being dispensed.

As another example, for H35 dispensing, there may only be one significant time consuming leak check that is taken into account for determination of the estimated time remaining (e.g. the first leak check at 22 MPa or a first leak check at 22 MPa+/0 5 MPa, i.e. a first leak check at a pressure in the 17 MPa-27 MPa range). In contrast, for H70 fuel dispensing, there may be at least two significant leak checks that are accounted for in the estimated time remaining determination (e.g. the first leak check at 40 MPa or a first leak check at 40 MPa+/5 MPa, i.e. a first leak check at a pressure in the 35 MPa-45 MPa range and a second leak check at 60 MPa or a second leak check at 40 MPa+/5 MPa, i.e. a second leak check at a pressure in the 55 MPa-65 MPa range).

Figure 7:
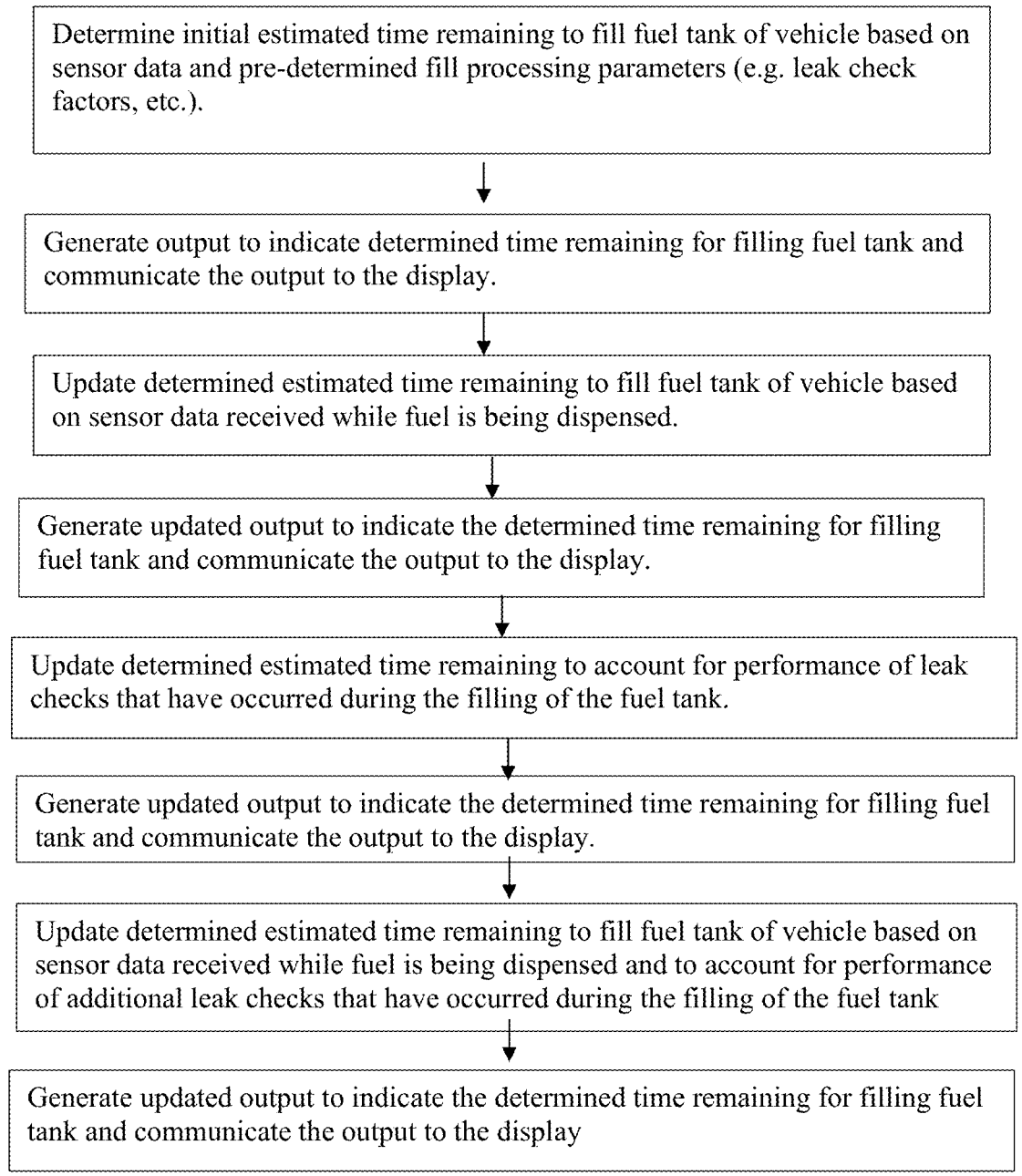
FIG. 7 is flow chart illustrating an exemplary process for generation of estimated time remaining indicia for display at a display 9 at a dispenser 8. A computer device 8c or a server 11 that is communicatively connected to a computer device 8c and/or display 9 can run code or an application stored in memory of the device to utilize this exemplary embodiment of the illustrated process. The updating of the estimated time remaining can occur continuously or occur repeatedly in pre-selected updating time cycle intervals, which can be defined to be one or more seconds, one or more minutes, or other time interval (e.g. every five seconds, every ten seconds, every 30 seconds, every minute, every 1.1 minutes, etc.). In some embodiments, the updating of the estimated time remaining can occur such that the cycle interval time period reduces in time as the vehicle fuel tank is filled (e.g. when the tank is at a pre-selected near filled capacity value, the updating time cycle can be shortened to increase the frequency with which the updating occurs). This pre-selected near filled capacity value can be selected to be at a value that would correspond to a 90% filled capacity for the fuel tank, for example).

FIG. 7 illustrates an exemplary method for estimating time remaining determinations for generation of the estimated time remaining indicia 9c. As discussed herein, the generated estimated time remaining indicia that is displayed via the display 9 can be generated based on one or more of the above noted techniques. The indicia can be displayed in a graphical user interface (GUI) at a display positioned at the dispenser 8 that is connected to a server 11 or a computer device 8c. In some embodiments, the computer device 8c can be positioned at the dispenser 8. In other embodiments, the computer device 8c can be remote from the display 9 and positioned at another location in the fueling station and be communicatively connected to the display 9 via a network connection (e.g. local area network connection, Ethernet connection, etc.). In some embodiments that utilize the server 11, the server 11 can be communicatively connected to the computer device 8c and/or the display 9 via at least one network connection.

The estimated time remaining indicia 9c can alternatively be displayed to indicate the estimated time remaining in other ways. For example, some embodiments can be configured so that a display of the remaining mass to be fed into a fuel tank can be shown as an indication of time remaining to fully fill the customer's fuel tank. In such embodiments, an amount of fuel left to be fed to a fuel tank can be determined to indicate the estimated time pressure by subtracting the mass of hydrogen fuel dispensed to a fuel tank from the amount of mass available to be fed to the fuel tank to fill the tank that was determined from an initial sensing of the fuel tank prior to dispensing fuel therein. This initial sensing of the fuel tank level and amount of fuel available to be added to the fuel tank before dispensing starts can be based on size, temperature, and/or pressure conditions of the fuel tank determined via sensor data or communications with a vehicle sensor transmitter of the vehicle outputting sensor data from pressure and/or temperature sensors of the vehicle monitoring the fuel tank status of the vehicle. Such data can also include data indicating or identifying the size of the fuel tank (e.g. volume capacity of the fuel tank, etc.).

As another example of a different way in which the estimated time remaining indicia 9c can be displayed to indicate the estimated time remaining, a remaining pressure to be increased during fueling can be shown to indicate a remaining time left for filling of the fuel tank. In such embodiments, the remaining pressure to be displayed can be a target end pressure value that has the measured current pressure value subtracted from that target pressure value to provide a pressure increase value that indicates an amount of time remaining until the pressure reaches the end pressure target value during the filling of the fuel tank. In such an approach, the estimated time remaining indicia 9c can display the difference between the target end pressure value and the current pressure value (e.g. time remaining indicia value equals the target end pressure value in MPa minus the current pressure value in MPa).

It should be appreciated that other modifications to the embodiments explicitly shown and discussed herein can be made to meet a particular set of design objectives or a particular set of design criteria. For instance, the type of display 9 and/or computer device 8c can be any of a number of suitable devices. As another example, the display can be a single liquid crystal display or monitor that generates a GUI or display of the various indicia or can include a housing that has multiple separately spaced apart displays that each display a separate type of indicia to a customer at the dispenser. As another example, the computer device 8c can be a controller, a computer, or other type of device that has sufficient hardware and software for communicating with the display 9 for generation of the indicia at the display 9.

As another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of my apparatuses for hydrogen dispensing, display units for hydrogen dispensing, graphical user interfaces for hydrogen dispensing, and methods of making and using the same have been shown and described above, it is to be distinctly understood that the invention is not limited thereto but may be otherwise variously embodied and practiced within the scope of the following claims.

What is claimed is:

1. A method for hydrogen dispensing, comprising:
providing at least one sensor arranged and positioned to collect measurement data for filling a fuel tank of a vehicle with hydrogen fuel;
providing a computer device communicatively connected to the at least one sensor, the computer device having a processor connected to a non-transitory computer readable medium;
providing a display device communicatively connected to the computer device to display estimated time remaining indicia to indicate an estimated time remaining to fill the fuel tank based on an estimated time remaining determined by the computer device and update the displayed estimated time remaining indicia as dispensing of hydrogen fuel to the fuel tank occurs based on an updated estimated time remaining determined by the computer device;
the computer device configured to determine the estimated time remaining via an estimated time remaining process defined by code stored in the non-transitory computer readable medium based on sensor data received from the at least one sensor; and
the computer device configured to determine the updated estimated time remaining based on the sensor data received from the at least one sensor while the fuel tank is being filled with the hydrogen fuel via an updated estimated time remaining process defined by code stored in the non-transitory computer readable medium;
wherein the estimated time remaining process comprises one of:
(a) End Pressure=$0.1227*(-0.0266*(35-StartP)^2+2.5891*(35-StartP))+32.313$, where "StartP" is a starting pressure in Mega Pascals (MPa) and End Pressure is an end pressure in MPa; and
(b) End Pressure=$0.2409*(-0.0149*(70-StartP)^2+2.0222*(70-StartP))+64.435$, where "StartP" is the starting pressure in MPa and End Pressure is the end pressure in MPa; and one of:
(c) Time remaining=End Pressure−Current Pressure/ Ramp Rate, where the Ramp Rate is a rate of an increase in pressure measured at the fuel tank in MPa; and
(d) Pressure Remaining=End Pressure−Current Pressure.

2. The method of claim 1, wherein at least one of:
the estimated time remaining process also comprises adding time to the estimated time remaining to account for performance of leak checks and/or bank switching; and
the updated estimated time remaining process also comprises adding time to the updated estimated time remaining to account for performance of leak checks and/or bank switching.

3. The method of claim 2, wherein the adding of time to the estimated time remaining to account for the performance of leak checks comprises:
multiplying a pre-determined number of leak checks to be performed during the filling of the fuel tank by a pre-selected leak check performance factor value.

4. The method of claim 2, wherein the adding of time to the estimated time remaining to account for the performance of leak checks comprises:
determining that a first leak check is to occur at a first pre-selected leak check pressure during the filing of the fuel tank and determining a first pre-selected leak check performance time factor value for the first leak check; and
determining that a second leak check is to occur at a second pre-selected leak check pressure during the filing of the fuel tank and determining a second pre-selected leak check performance time factor value for the second leak check.

5. The method of claim 4, wherein the first pre-selected leak check pressure is in a first leak check pressure range of 30 MPa and 50 MPa and the second pre-selected leak check pressure is in a second leak check pressure range of 50 MPa and 70 MPa.

6. The method of claim 5, wherein the first pre-selected leak check performance time factor value is greater than the second pre-selected leak check performance time factor value.

7. The method of claim 4, wherein the first pre-selected leak check performance time factor value is greater than the second pre-selected leak check performance time factor value and the first pre-selected leak check pressure is less than the second pre-selected leak check pressure.

8. The method of claim 4, wherein the display is a liquid crystal display positioned at the dispenser of a fueling station, the dispenser having a fuel nozzle to connect the dispenser to the fuel tank to fill the fuel tank with the hydrogen fuel.

9. The method of claim 8, wherein the computer device is a computer device positioned at the dispenser or positioned remote from the dispenser.

10. A method for hydrogen dispensing, comprising:
providing at least one sensor arranged and positioned to collect measurement data for filling a fuel tank of a vehicle with hydrogen fuel;
providing a computer device communicatively connected to the at least one sensor, the computer device having a processor connected to a non-transitory computer readable medium;
providing a display device communicatively connected to the computer device to display estimated time remaining indicia to indicate an estimated time remaining to fill the fuel tank based on an estimated time remaining determined by the computer device and update the displayed estimated time remaining indicia as dispensing of hydrogen fuel to the fuel tank occurs based on an updated estimated time remaining determined by the computer device;
the computer device configured to determine the estimated time remaining via an estimated time remaining process defined by code stored in the non-transitory computer readable medium based on sensor data received from the at least one sensor; and
the computer device configured to determine the updated estimated time remaining based on the sensor data received from the at least one sensor while the fuel tank is being filled with the hydrogen fuel via an updated estimated time remaining process defined by code stored in the non-transitory computer readable medium;
wherein at least one of: the estimated time remaining process also comprises adding time to the estimated time remaining to account for performance of leak checks and/or bank switching; and the updated estimated time remaining process also comprises adding time to the updated estimated time remaining to account for performance of leak checks and/or bank switching; and
wherein the adding of time to the estimated time remaining to account for the performance of leak checks comprises: multiplying a pre-determined number of leak checks to be performed during the filling of the fuel tank by a pre-selected leak check performance factor value.

11. The method of claim 10, wherein the adding of time to the estimated time remaining to account for the performance of leak checks comprises
determining that a first leak check is to occur at a first pre-selected leak check pressure during the filing of the fuel tank and determining a first pre-selected leak check performance time factor value for the first leak check; and
determining that a second leak check is to occur at a second pre-selected leak check pressure during the filing of the fuel tank and determining a second pre-selected leak check performance time factor value for the second leak check.

12. The method of claim 11, wherein the first pre-selected leak check pressure is in a first leak check pressure range of 30 MPa and 50 MPa and the second pre-selected leak check pressure is in a second leak check pressure range of 50 MPa and 70 MPa.

13. The method of claim 12, wherein the first pre-selected leak check performance time factor value is greater than the second pre-selected leak check performance time factor value.

14. The method of claim 11, wherein the first pre-selected leak check performance time factor value is greater than the second pre-selected leak check performance time factor value and the first pre-selected leak check pressure is less than the second pre-selected leak check pressure.

15. The method of claim 11, wherein the display is a liquid crystal display positioned at the dispenser of a fueling station, the dispenser having a fuel nozzle to connect the dispenser to the fuel tank to fill the fuel tank with the hydrogen fuel.

16. A method for hydrogen dispensing, comprising:
providing at least one sensor arranged and positioned to collect measurement data for filling a fuel tank of a vehicle with hydrogen fuel;
providing a computer device communicatively connected to the at least one sensor, the computer device having a processor connected to a non-transitory computer readable medium;

providing a display device communicatively connected to the computer device to display estimated time remaining indicia to indicate an estimated time remaining to fill the fuel tank based on an estimated time remaining determined by the computer device and update the displayed estimated time remaining indicia as dispensing of hydrogen fuel to the fuel tank occurs based on an updated estimated time remaining determined by the computer device;

the computer device configured to determine the estimated time remaining via an estimated time remaining process defined by code stored in the non-transitory computer readable medium based on sensor data received from the at least one sensor; and the computer device configured to determine the updated estimated time remaining based on the sensor data received from the at least one sensor while the fuel tank is being filled with the hydrogen fuel via an updated estimated time remaining process defined by code stored in the non-transitory computer readable medium;

wherein at least one of: the estimated time remaining process also comprises adding time to the estimated time remaining to account for performance of leak checks and/or bank switching; and the updated estimated time remaining process also comprises adding time to the updated estimated time remaining to account for performance of leak checks and/or bank switching; and wherein the adding of time to the estimated time remaining to account for the performance of leak checks comprises determining that a first leak check is to occur at a first pre-selected leak check pressure during the filing of the fuel tank and determining a first pre-selected leak check performance time factor value for the first leak check; and determining that a second leak check is to occur at a second pre-selected leak check pressure during the filing of the fuel tank and determining a second pre-selected leak check performance time factor value for the second leak check.

17. The method of claim 16, wherein the first pre-selected leak check pressure is in a first leak check pressure range of 30 MPa and 50 MPa and the second pre-selected leak check pressure is in a second leak check pressure range of 50 MPa and 70 MPa.

18. The method of claim 17, wherein the first pre-selected leak check performance time factor value is greater than the second pre-selected leak check performance time factor value.

19. The method of claim 16, wherein the first pre-selected leak check performance time factor value is greater than the second pre-selected leak check performance time factor value and the first pre-selected leak check pressure is less than the second pre-selected leak check pressure.

20. The method of claim 16, wherein the display is a liquid crystal display positioned at the dispenser of a fueling station, the dispenser having a fuel nozzle to connect the dispenser to the fuel tank to fill the fuel tank with the hydrogen fuel.

* * * * *